US012615157B2

(12) United States Patent (10) Patent No.: US 12,615,157 B2
Oe et al. (45) Date of Patent: Apr. 28, 2026

(54) FACILITY USAGE CONTROL APPARATUS, SYSTEM, METHOD, AND COMPUTER READABLE MEDIUM

(71) Applicant: NEC Corporation, Tokyo (JP)

(72) Inventors: Takeyoshi Oe, Tokyo (JP); Huiyu Zhang, Tokyo (JP); Yuki Ikeda, Tokyo (JP); Koshiro Nomoto, Tokyo (JP); Yusuke Miyamoto, Tokyo (JP); Saki Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 219 days.

(21) Appl. No.: 18/565,197

(22) PCT Filed: Jun. 3, 2021

(86) PCT No.: PCT/JP2021/021172
§ 371 (c)(1),
(2) Date: Nov. 29, 2023

(87) PCT Pub. No.: WO2022/254650
PCT Pub. Date: Dec. 8, 2022

(65) Prior Publication Data
US 2024/0243923 A1 Jul. 18, 2024

(51) Int. Cl.
*H04L 9/40* (2022.01)
*H04L 9/32* (2006.01)
*G06Q 50/12* (2012.01)

(52) U.S. Cl.
CPC ........ *H04L 9/3247* (2013.01); *H04L 63/0861* (2013.01); *G06Q 50/12* (2013.01)

(58) Field of Classification Search
CPC .... H04L 9/3247; H04L 63/0861; G06Q 50/12
See application file for complete search history.

(56) References Cited

U.S. PATENT DOCUMENTS 10,333,721 B2 * 6/2019 Uhr ....................... H04L 9/3236
11,611,550 B1 * 3/2023 Chavez ............... H04L 63/1433
(Continued)

FOREIGN PATENT DOCUMENTS

JP 2002-007934 A 1/2002
JP 2014-235540 A 12/2014
(Continued)

OTHER PUBLICATIONS

International Search Report for PCT Application No. PCT/JP2021/021172, mailed on Aug. 31, 2021.

*Primary Examiner* — Ghodrat Jamshidi
(74) *Attorney, Agent, or Firm* — Sughrue Mion, PLLC

(57) ABSTRACT

A facility usage control apparatus is configured to register identity identification information for registration of a user who makes a reservation to use a predetermined facility, a mobile terminal of the user, and reservation information of the facility in association with each other, control authentication using the identity identification information for registration based on identity identification information for authentication acquired from the user through a first authentication terminal installed at the facility, identify the reservation information associated with the identity identification information for registration of the user who has been successfully authenticated, determine availability of the facility based on the identified reservation information, make a signature request to the mobile terminal associated with the identity identification information for registration when the user is determined that he/she can use the facility, and acquire signature data input by the user to the mobile terminal.

11 Claims, 21 Drawing Sheets

(56)                    References Cited

U.S. PATENT DOCUMENTS

| | | | | |
|---|---|---|---|---|
| 11,727,468 | B2 * | 8/2023 | Miyajima | .......... G06Q 30/0639 |
| | | | | 705/26.1 |
| 2014/0032377 | A1 * | 1/2014 | Oxenham | .............. G06Q 10/02 |
| | | | | 705/27.2 |
| 2016/0283868 | A1 * | 9/2016 | Oku | ...................... H04M 3/385 |
| 2018/0061155 | A1 * | 3/2018 | Ghorpade | .......... G07C 9/00571 |
| 2018/0068333 | A1 * | 3/2018 | Dey | ................... G06Q 30/0207 |
| 2018/0191504 | A1 * | 7/2018 | An | ...................... H04W 12/062 |
| 2018/0260877 | A1 * | 9/2018 | Li | ...................... G06Q 30/0633 |
| 2018/0294966 | A1 * | 10/2018 | Hyun | ................... H04L 9/3226 |
| 2019/0087639 | A1 | 3/2019 | Crane | |
| 2024/0073039 | A1 * | 2/2024 | De Feo | ................ H04L 9/3247 |

FOREIGN PATENT DOCUMENTS

| | | | | |
|---|---|---|---|---|
| JP | 2020-095700 | A | 6/2020 | |
| JP | 2020-101850 | A | 7/2020 | |
| JP | 2020-182860 | A | 11/2020 | |
| JP | 2020-201665 | A | 12/2020 | |
| JP | 2021-068371 | A | 4/2021 | |
| WO | WO-2019184924 | A1 * | 10/2019 | ......... G06Q 20/3829 |

* cited by examiner

500

AUTHENTICATION TERMINAL

510  CAMERA

520  STORAGE UNIT

521  PROGRAM

530  MEMORY

540  COMMUNICATION UNIT

550  INPUT/OUTPUT UNIT

CONTROL UNIT  560

DISPLAY CONTROL UNIT  561

AUTHENTICATION REQUEST UNIT  562

UNLOCK CONTROL UNIT  563

400          RESERVATION MANAGEMENT APPARATUS

410          STORAGE UNIT

411          PROGRAM

412          RESERVATION INFORMATION DB

4121          RESERVATION NUMBER

4122          RESERVATION DETAILS

4123          PAYMENT COMPLETION FLAG

4124          RESERVER INFORMATION

41241          USER ID

41242          PERSONAL INFORMATION

41243          SIGNATURE DATA

420          MEMORY

430          COMMUNICATION UNIT

440          CONTROL UNIT

441          REGISTRATION UNIT

442          SEARCH UNIT

Fig. 13

RESERVATION MANAGEMENT APPARATUS

FACILITY USAGE CONTROL APPARATUS

AUTHENTICATION TERMINAL

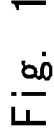

USER

MOBILE TERMINAL

S421 SIGNATURE REQUEST

DISPLAY SIGNATURE INPUT SCREEN

S422

S423 SIGN

S424 SIGNATURE DATA

S425 ASSIGN ROOM NUMBER

S426 RESERVATION INFORMATION UPDATE REQUEST (RESERVATION NUMBER, ROOM NUMBER, SIGNATURE DATA)

S427 RESERVATION INFORMATION UPDATE PROCESSING

S428 ROOM NUMBER

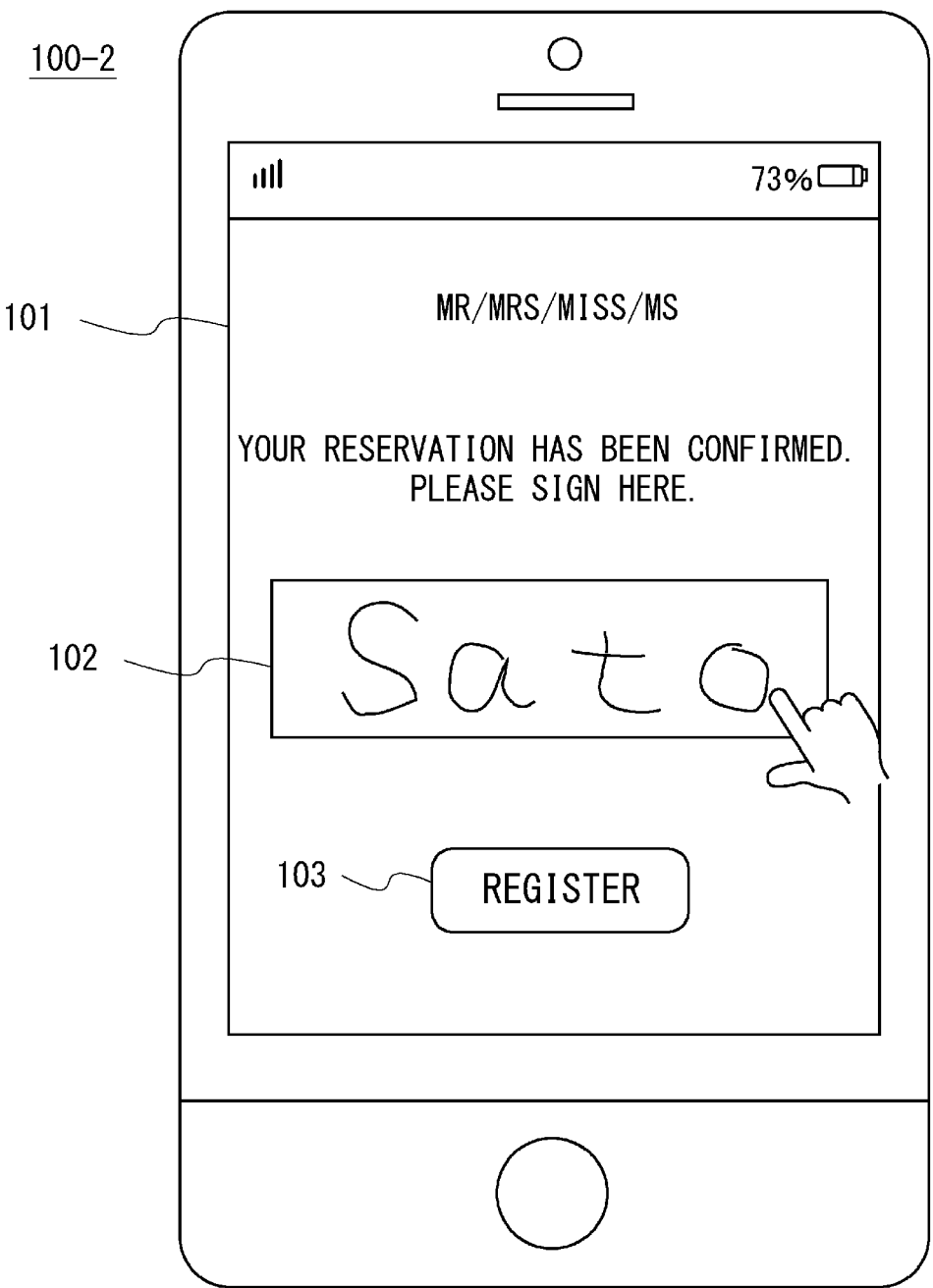
100-2
101
102
103
F i g.  14

100-2

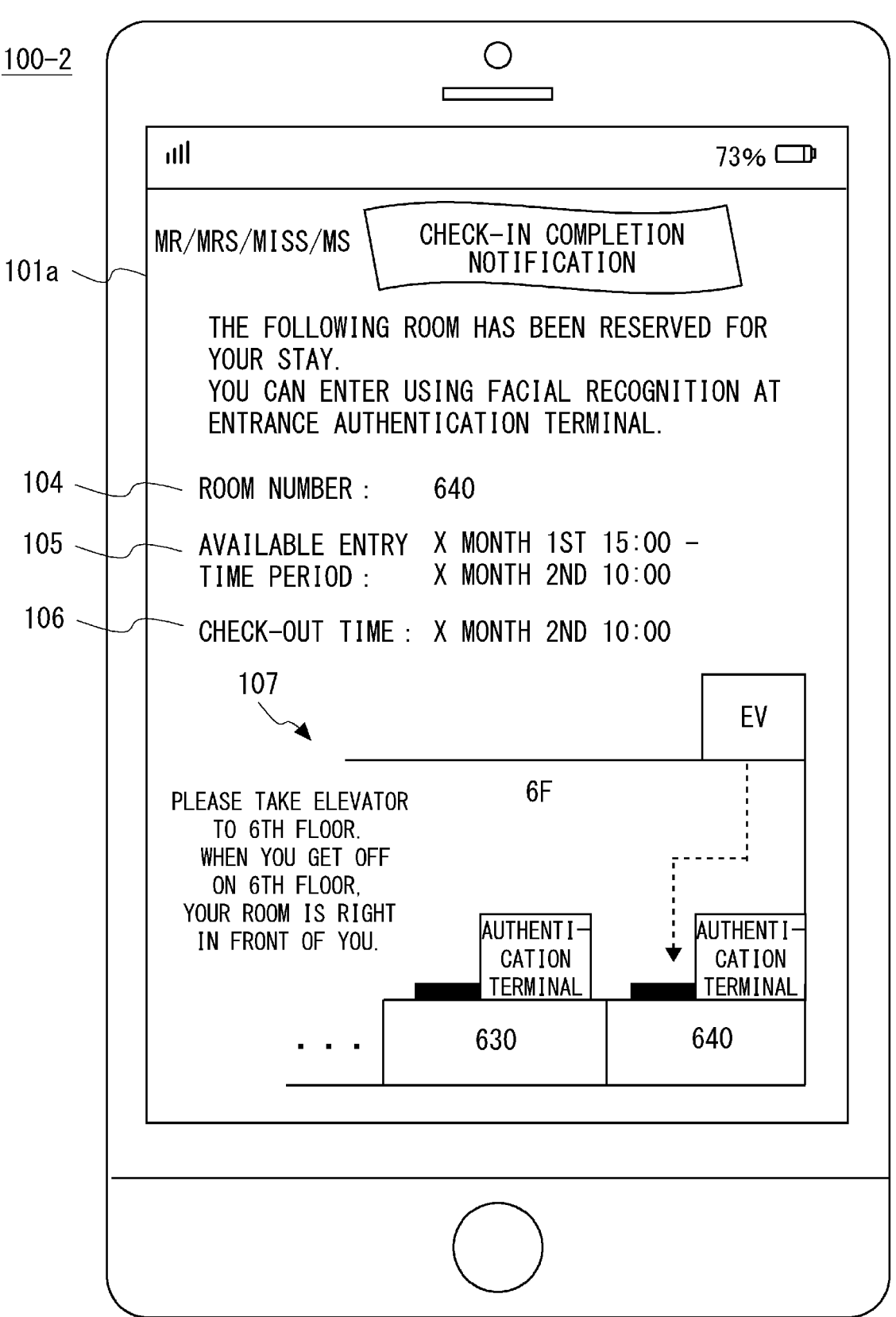

101a

MR/MRS/MISS/MS | CHECK-IN COMPLETION NOTIFICATION

THE FOLLOWING ROOM HAS BEEN RESERVED FOR YOUR STAY.
YOU CAN ENTER USING FACIAL RECOGNITION AT ENTRANCE AUTHENTICATION TERMINAL.

104 — ROOM NUMBER :     640

105 — AVAILABLE ENTRY   X MONTH 1ST 15:00 –
TIME PERIOD :           X MONTH 2ND 10:00

106 — CHECK-OUT TIME : X MONTH 2ND 10:00

107

EV

6F

PLEASE TAKE ELEVATOR
TO 6TH FLOOR.
WHEN YOU GET OFF
ON 6TH FLOOR,
YOUR ROOM IS RIGHT
IN FRONT OF YOU.

AUTHENTI-CATION TERMINAL     AUTHENTI-CATION TERMINAL

100a — MOBILE TERMINAL

110 — CAMERA

120 — STORAGE UNIT
121 — PROGRAM
122a — CODE INFORMATION

130 — MEMORY
140 — COMMUNICATION UNIT
150 — INPUT/OUTPUT UNIT

160 — CONTROL UNIT
161 — DISPLAY CONTROL UNIT
162 — REGISTRATION UNIT
163 — SIGNATURE PROCESSING UNIT

FACILITY USAGE CONTROL APPARATUS, SYSTEM, METHOD, AND COMPUTER READABLE MEDIUM

This application is a National Stage Entry of PCT/JP2021/021172 filed on Jun. 3, 2021, the contents of all of which are incorporated herein by reference, in their entirety.

TECHNICAL FIELD

The present disclosure relates to a facility usage control apparatus, system, method, and computer readable medium. In particular the present disclosure relates to a facility usage control apparatus, system, method, and program for controlling facility usage by a user who has made a reservation to use a facility.

BACKGROUND ART

Recently, there has been a demand for non-contact and non-face-to-face procedures in accommodation facilities such as hotels. Patent Literature 1 discloses a technology related to a facility usage management system. An authentication server of the facility usage management system performs identity authentication by comparing customer information obtained from a customer through a website at the time of check-in with customer information registered in advance. Patent Literature 2 discloses a technology for signing when using a mobile game apparatus.

CITATION LIST

Patent Literature

Patent Literature 1: Japanese Unexamined Patent Application Publication No. 2020-201665
Patent Literature 2: Japanese Unexamined Patent Application Publication No. 2020-182860

SUMMARY OF INVENTION

Technical Problem

Patent Literature 1 can automate identity authentication, but there is room for improvement in the check-in procedure. Patent Literature 2 is not a technology related to the usage of facilities.

An object of the present disclosure is to provide a facility usage control apparatus, system, method, and program for achieving a facility usage procedure in a non-contact manner in view of the above-mentioned problem.

Solution to Problem

A first example aspect of the present disclosure is a facility usage control apparatus including:
registration means for registering identity identification information for registration of a user who makes a reservation to use a predetermined facility, a mobile terminal of the user, and reservation information of the facility in association with each other;
authentication control means for controlling authentication using the identity identification information for registration based on identity identification information for authentication acquired from the user through a first authentication terminal installed at the facility;

identification means for identifying the reservation information associated with the identity identification information for registration of the user who has been successfully authenticated;
determination means for determining availability of the facility based on the identified reservation information;
signature request means for making a signature request to the mobile terminal associated with the identity identification information for registration when the user is determined that he/she can use the facility; and
signature acquisition means for acquiring signature data input by the user to the mobile terminal.

A second example embodiment of the present disclosure is facility usage control system including:
a mobile terminal of a user who makes a reservation to use a predetermined facility;
a first authentication terminal installed at the facility; and
a facility usage control apparatus configured to control the use of the facility, wherein the facility usage control apparatus comprises:
registration means for registering identity identification information for registration of the user, the mobile terminal of the user, and reservation information of the facility in association with each other;
authentication control means for controlling authentication using the identity identification information for registration based on identity identification information for authentication acquired from the user through the first authentication terminal;
identification means for identifying the reservation information associated with the identity identification information for registration of the user who has been successfully authenticated;
determination means for determining availability of the facility based on the identified reservation information;
signature request means for making a signature request to the mobile terminal associated with the identity identification information for registration when the user is determined that he/she can use the facility; and
signature acquisition means for acquiring signature data input by the user to the mobile terminal.

A third example aspect of the present disclosure is a facility usage control method performed by a computer comprising:
registering identity identification information for registration of a user who makes a reservation to use a predetermined facility, a mobile terminal of the user, and reservation information of the facility in association with each other;
controlling authentication using the identity identification information for registration based on identity identification information for authentication acquired from the user through a first authentication terminal installed at the facility;
identifying the reservation information associated with the identity identification information for registration of the user who has been successfully authenticated;
determining availability of the facility based on the identified reservation information;
making a signature request to the mobile terminal associated with the identity identification information for registration when the user is determined that he/she can use the facility; and
acquiring signature data input by the user to the mobile terminal.

A fourth example aspect of the present disclosure is a facility usage control program for causing a computer to execute:

registration processing for registering identity identification information for registration of a user who makes a reservation to use a predetermined facility, a mobile terminal of the user, and reservation information of the facility in association with each other;

authentication control processing for controlling authentication using the identity identification information for registration based on identity identification information for authentication acquired from the user through a first authentication terminal installed at the facility;

identification processing for identifying the reservation information associated with the identity identification information for registration of the user who has been successfully authenticated;

determination processing for determining availability of the facility based on the identified reservation information;

signature request processing for making a signature request to the mobile terminal associated with the identity identification information for registration when the user is determined that he/she can use the facility; and signature acquisition processing for acquiring signature data input by the user to the mobile terminal.

Advantageous Effects of Invention

According to the present disclosure, it is possible to provide a facility usage control apparatus, system, method, and program for achieving a facility usage procedure in a non-contact manner in view of the above-mentioned problem.

BRIEF DESCRIPTION OF DRAWINGS

FIG. 13 is a sequence diagram showing a flow of check-in processing (second half) according to the second example embodiment;

FIG. 14 shows an example of a signature input screen on a mobile terminal according to the second example embodiment;

FIG. 15 shows an example of a check-in completion notification screen displayed on a mobile terminal of a user according to the second example embodiment;

EXAMPLE EMBODIMENT

Example embodiments of the present disclosure will be described in detail below with reference to the drawings. In each drawing, the same or corresponding elements are denoted by the same reference signs, and repeated descriptions will be omitted as necessary for clarity.

First Example Embodiment

Figure 1:
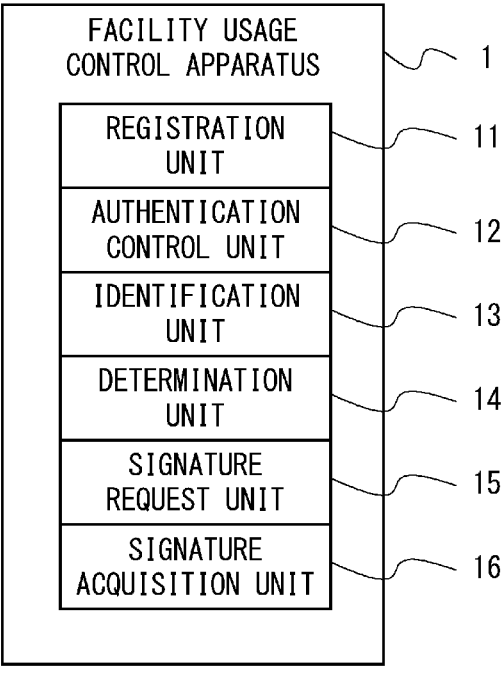
FIG. 1 is a block diagram showing a configuration of a facility usage control apparatus according to a first example embodiment.

FIG. 1 is a block diagram showing a configuration of a facility usage control apparatus 1 according to the first example embodiment. The facility usage control apparatus 1 is an information processing apparatus for controlling, when a user uses a predetermined facility, usage procedures without contacting a terminal of the facility. Here, assume that the user arrives at the facility where he/she has made a reservation for use while carrying his/her own mobile terminal. In addition, assume that the facility is provided with a first authentication terminal for performing the usage procedures. The facility usage control apparatus 1 is assumed to be communicatively connected to the mobile terminal and the first authentication terminal.

The facility usage control apparatus 1 includes a registration unit 11, an authentication control unit 12, an identification unit 13, a determination unit 14, a signature request unit 15, and a signature acquisition unit 16. The registration unit 11 registers identity identification information for registration of the user who reserves use of a predetermined facility, the user's mobile terminal, and reservation information of the facility in association with each other.

The authentication control unit 12 controls authentication using the identity identification information for registration based on identity identification information for authentication obtained from the user through the first authentication terminal installed at the facility. The identification unit 13 identifies the reservation information associated with the identity identification information for registration of the user who has been successfully authenticated. The determination unit 14 determines the availability of the facility based on the identified reservation information. When the user is determined that he/she can use the facility, the signature request unit 15 makes a signature request to the mobile terminal associated with the identity identification information for registration. The signature acquisition unit 16 acquires signature data input to the mobile terminal by the user.

Figure 2:
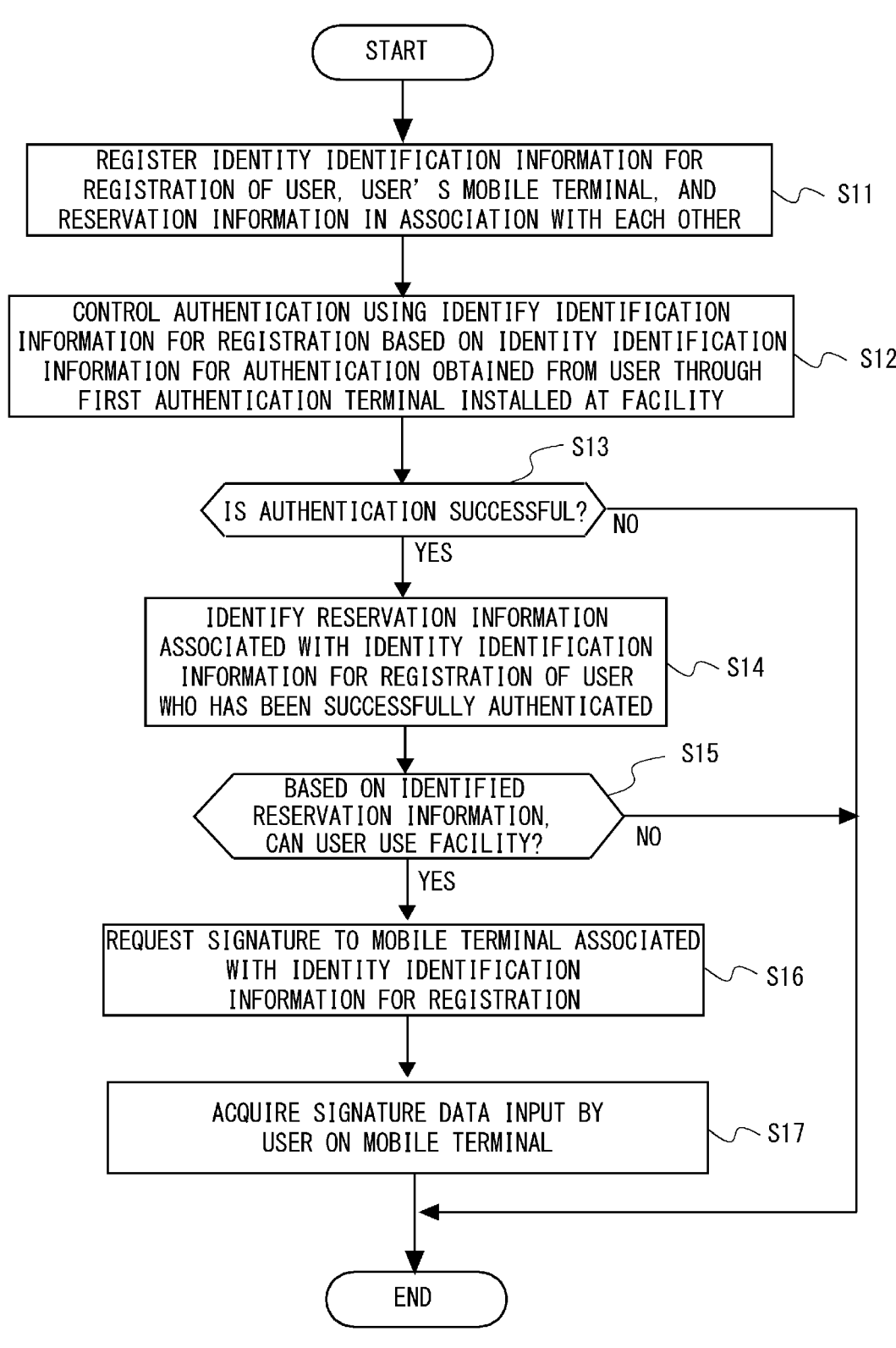
FIG. 2 is a flowchart showing a flow of a facility usage control method according to the first example embodiment.

FIG. 2 is a flowchart showing a flow of a facility usage control method according to the first example embodiment. For example, the user reserves the use of a predetermined facility using the mobile terminal. In this case, the registration unit 11 receives, from the mobile terminal, the identity identification information for registration of the user who reserves the use of the predetermined facility, (information identifying) the user's mobile terminal, and the reservation information of the facility. Note that the registration unit 11 may receive the identity identification information, the information identifying the mobile terminal, and the reservation information from an information processing apparatus other than the mobile terminal.

The registration unit 11 registers the received identity identification information for registration, information identifying the user's mobile terminal, and reservation information of the facility in association with each other (S11). For example, the registration unit 11 registers the information in a storage device included in the facility usage control apparatus 1 or in an external storage device connected to the facility usage control apparatus 1.

Next, the user arrives at the reserved facility while carrying his/her mobile terminal. The first authentication terminal installed in the facility acquires the identity identification information for authentication from the user, and transmits the acquired identity identification information to the facility usage control apparatus 1. In response to this, the authentication control unit 12 of the facility usage control apparatus 1 controls authentication using the identify identification information for registration based on the identity identification information for authentication obtained from the user through the first authentication terminal installed at the facility (S12). For example, the authentication control unit 12 may control authentication by comparing the identity identification information for authentication with the identity identification information for registration. Alternatively, the authentication control unit 12 may control authentication by having an external authentication apparatus compare the identity identification information for authentication with the identity identification information for registration.

Next, the authentication control unit 12 determines whether or not the authentication in Step S12 is successful (S13). When the authentication is successful (YES in S13), the identification unit 13 identifies the reservation information associated with the identity identification information for registration of the user who has been successfully authenticated (S14). Next, the determination unit 14 determines the availability of the facility based on the identified reservation information (S15). When it is determined that the user who has been successfully authenticated can use the facility (YES in S15), the signature request unit 15 makes a signature request to the mobile terminal associated with the identity identification information for registration (S16). For example, the signature request unit 15 transmits the signature request to the mobile terminal of the user who has been successfully authenticated. In response to this, the mobile terminal receives a signature input operation from the user and returns input signature data to the facility usage control apparatus 1. The signature acquisition unit 16 acquires the signature data input by the user on the mobile terminal (S17). In this way, the user can complete the usage procedure of the facility.

Thus, the facility usage control apparatus 1 according to this example embodiment can control the usage procedure by a user who has reserved the use of a predetermined facility without having to contact equipment within the facility such as the first authentication terminal. In other words, the user does not need to communicate the reservation information to staff at the reception of the facility and does not need to manually sign paper documents of the facility for the usage procedure. Therefore, it is possible to achieve a contactless usage procedure of the facility.

The facility usage control apparatus 1 includes a processor, a memory, and a storage device as a configuration not shown. The storage device also stores computer programs in which processing of the facility usage control method according to this example embodiment is implemented. The processor reads the computer programs from the storage device into the memory and executes the computer programs. In this way, the processor implements the functions of the registration unit 11, the authentication control unit 12, the identification unit 13, the determination unit 14, the signature request unit 15, and the signature acquisition unit 16.

Alternatively, each component of the facility usage control apparatus 1 may be implemented by dedicated hardware. Further, some or all of the constituent elements of each apparatus may be implemented by general-purpose or dedicated circuitry, processors, etc., or a combination thereof. These constituent elements may be composed of a single chip or a plurality of chips connected via a bus. Some or all of the constituent elements of each apparatus may be implemented by a combination of the circuitry, the program, and the like described above. The processor may be a CPU (Central Processing Unit), a GPU (Graphics Processing Unit), an FPGA (Field-Programmable Gate Array), quantum processor (quantum computer control chip), or the like.

Further, when some or all of the constituent elements of the facility usage control apparatus 1 are implemented by a plurality of information processing apparatuses, circuitry, etc., the plurality of information processing apparatuses, circuitry, and the like, may be collectively arranged or arranged separate from each other. For example, the information processing apparatus, the circuitry, and the like may be implemented as a form where they are connected to each other via a communication network, such as a client server system, a cloud computing system, and the like. Further, the function of the facility usage control apparatus 1 may be provided in a Saas (Software as a Service) format.

Second Example Embodiment

Figure 3:
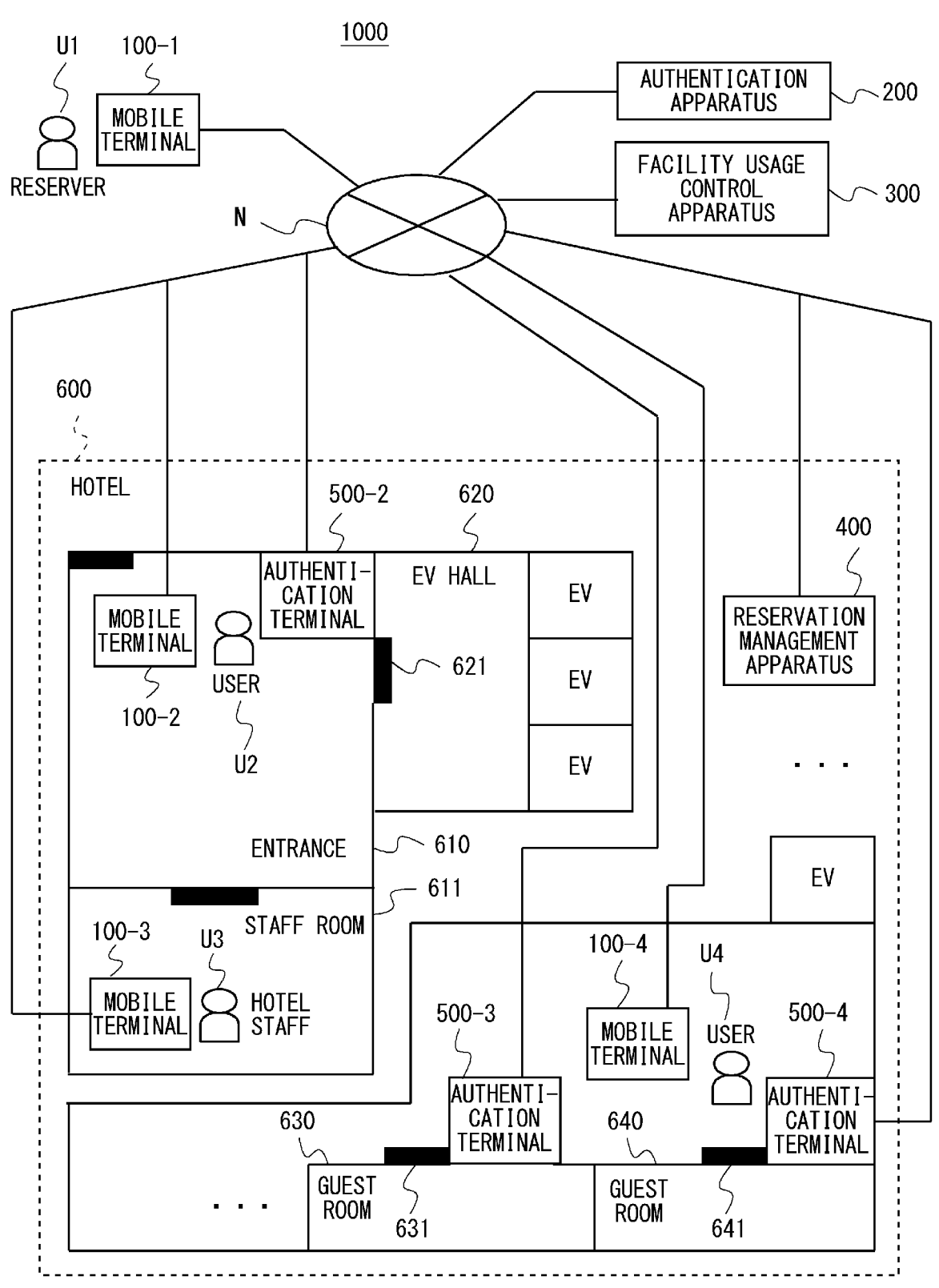
FIG. 3 is a block diagram showing an overall configuration of a facility usage control system according to a second example embodiment.

A second example embodiment is a specific example of the first example embodiment described above. FIG. 3 is a block diagram showing an overall configuration of a facility usage control system 1000 according to the second example embodiment. The facility usage control system 1000 is an information system for controlling, for example, reservation of a predetermined facility, usage procedures (check-in, etc.), entry and exit of a user into an area permitted for use within the facility. A predetermined facility is a facility having a plurality of areas and requiring prior reservations. Reservations and permission for use may be granted on an area-by-area basis. For example, the hotel 600 is an example of the predetermined facility. The hotel 600 includes a plurality of areas such as an entrance 610, a staff room 611, an EV (Elevator) hall 620, a guest room 630, and a guest room 640. The entrance 610 is an area where visitors can freely enter and exit from the outside. The entrance 610 is, for example, the front desk of the hotel 600. The entrance 610, the staff room 611, and the EV hall 620 shall be adjacent to each other. The staff room 611 is a room where a hotel staff U3 waits. In the EV hall 620, an authentication terminal 500-2 and a gate apparatus 621 are installed at the entrance. Only the user or the hotel staff U3 who has reserved the use of the hotel 600 can enter the EV hall 620. Specifically, when the reservation is confirmed and the predetermined usage procedure is completed, such as when a predetermined person has been successfully authenticated by the authentication terminal 500-2, or when the person has been successfully authenticated and is confirmed to be a hotel staff, the gate apparatus 621 is unlocked and the person who has been successfully authenticated can enter the EV hall 620. In addition, one or more elevators are installed in the EV hall 620, allowing access to the floor of the guest rooms 630 and 640 by one elevator. In the guest room 630, an authentication terminal 500-3 and a gate apparatus 631 are installed at the entrance. The guest room 640 is provided with an authentication terminal 500-4 and a gate apparatus 641 at the entrance. Only a user authorized to use the guest room or a predetermined hotel staff can enter the guest rooms 630 and 640. For example, if a predetermined person is successfully authenticated by the authentication terminal 500-3, the gate apparatus 631 is unlocked and the person succeeded in the authentication can enter the gate apparatus 631. In the following description, if it is not necessary to specifically distinguish the authentication terminals 500-2, 500-3, and 500-4, they will be collectively referred to simply as the "authentication terminals 500". Furthermore, in the following description, if it is not necessary to specifically distinguish the gate apparatuses 621, 631, and 641, they will be collectively referred to simply as the "gate apparatuses".

A reserver U1, a user U2, the hotel staff U3, and a user U4 carry mobile terminals 100-1, 100-2, 100-3, and 100-4, respectively. Here, the reserver U1, the user U2, and the user U4 are users of the facility usage control system 1000, in particular, the hotel 600. The reserver U1 is a person who makes a reservation for a room of a certain room type in the hotel 600 using the mobile terminal 100-1. It is assumed that the user U2 and the user U4 reserve the use of the hotel 600 in advance. The hotel staff U3 may perform confirmation and other actions through the mobile terminal 100-3 during the usage procedure of the user U2 and others. Therefore, the mobile terminal 100-3 does not necessarily need to have the same function as those of the mobile terminals 100-1, 100-2, and 100-4. In the following description, when it is not necessary to specifically distinguish the mobile terminals 100-1, 100-2, 100-3, and 100-4, they will be collectively referred to simply as the "mobile terminals 100".

The facility usage control system 1000 includes the mobile terminals 100, an authentication apparatus 200, a facility usage control apparatus 300, a reservation management apparatus 400, and an authentication terminal 500. Each of the mobile terminals 100, the authentication apparatus 200, the facility usage control apparatus 300, the reservation management apparatus 400, and the authentication terminal 500 is connected via a network N. The network N is a wired or wireless communication line or communication network, such as the Internet. The network N is not limited to a specific type of communication protocol.

In the following description, the authentication of identity confirmation is exemplified as face authentication, which is an example of biometric authentication, and identity confirmation information (identity identification information) is defined as face feature information, which is one example of biometric information. However, for biometric authentication and biometric information, other techniques using captured images may be employed. For example, biometric information may use data (feature quantities) calculated from unique physical characteristics of an individual, such as fingerprints, voiceprints, veins, retina, pupil iris, and palm patterns. Further, authentication for identity confirmation may be done using methods other than biometric authentication, and identity identification information may be other than biometric information. For example, identity identification information may include, but is not limited to, combinations of ID and password, electronic certificates, two-dimensional codes, and so on.

The mobile terminal 100 is an information terminal carried by each user and transmits and receives data to and from the facility usage control apparatus 300 via the network N by wireless communication. The mobile terminal 100 is a mobile telephone terminal, a smartphone, a tablet terminal, or the like.

Figure 4:
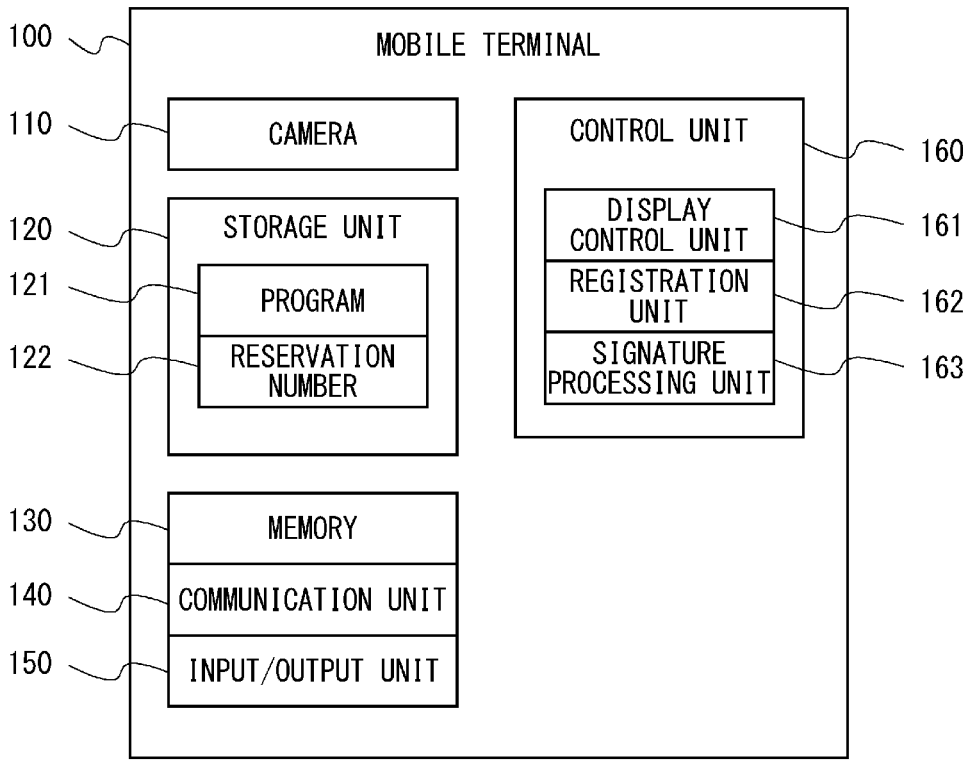
FIG. 4 is a block diagram showing a configuration of a mobile terminal according to the second example embodiment.

FIG. 4 is a block diagram showing a configuration of the mobile terminal 100 according to the second example embodiment. The mobile terminal 100 includes a camera 110, a storage unit 120, a memory 130, a communication unit 140, an input/output unit 150, and a control unit 160. The camera 110 is a photographing apparatus for capturing images under the control of the control unit 160. The storage unit 120 is an example of a storage device such as a flash memory. The storage unit 120 stores a program 121 and a reservation number 122. The program 121 is a computer program in which processing including facility usage reservation processing, signature input processing, and so on described later is implemented. For example, the program 121 includes a client application corresponding to the facility usage control apparatus 300. The reservation number 122 is an identification number of the reservation issued at the time of reserving the hotel 600. However, the storage unit 120 need not necessarily store the reservation number 122.

The memory 130 is a volatile storage device such as RAM (Random Access Memory) and is a storage area for temporarily holding information when the control unit 160 operates. The communication unit 140 is a communication interface with the network N. The input/output unit 150 includes a display apparatus (display unit) such as a screen and an input apparatus. The input/output unit 150 is, for example, a touch panel. The control unit 160 is a processor that controls hardware of the mobile terminal 100. The control unit 160 reads the program 121 from the storage unit 120 into the memory 130 and executes it. Thus, the control unit 160 implements the functions of a display control unit 161, a registration unit 162, and a signature processing unit 163.

The display control unit 161 controls the input/output unit 150 to display a facility usage reservation screen, a signature input screen, or the like. The display control unit 161 also controls the input/output unit 150 to display the reservation number, the room number, and so on received from the facility usage control apparatus 300 via the network N.

The registration unit 162 performs the facility usage reservation processing, which is the registration processing of reservation information for using the facility. Specifically, the registration unit 162 accepts a face image and personal information about a reserver and an accompanying person input by the user, and reservation information of the facility. The registration unit 162 may accept a face image of the user captured by the camera 110. The registration unit 162 may also accept a face image from another mobile terminal or information processing apparatus. The personal information includes name, address, telephone number, previous stay location, next stay location, payment information, and so on of the reserver. The payment information may be credit card information, bank account information, or the like. The reservation information includes the place of stay (hotel name, address, etc.), a length of stay, a room type, the number of guests, a usage fee, and so on. The registration unit 162 uses terminal information about the mobile terminal 100 at the time of registration. The terminal information is information about a destination for receiving notifications when the mobile terminal 100 accepts notification of information from the facility usage control apparatus 300. The terminal information is, for example, a terminal ID, a login ID of a client application, an account of SNS (Social Network Service), an email address, and so on. The registration unit 162 transmits a reservation registration request including the face image, the personal information, the reservation information, and the terminal information about the reserver, etc. to the facility usage control apparatus 300. Note that the face image is an example of the identity identification information for registration. Therefore, the registration unit 162 may include other identification information described above in the reservation registration request for registration instead of the face image. In addition, the registration unit 162 may register the reservation number, the room number, and so on received from the facility usage control apparatus 300 via the network N to the storage unit 120.

When the signature request is received from the facility usage control apparatus 300, the signature processing unit 163 causes the input/output unit 150 to display the signature input screen via the display control unit 161. Next, the signature processing unit 163 receives signature input by the user via the input/output unit 150 and transmits signature data to the facility usage control apparatus 300. The signature is a representation of the user's agreement to the contract terms and notices when using the facility. The signature data indicates a trajectory of the position where the user has contacted the input/output unit 150 (touch panel) or image data of the signature or the like.

Returning to FIG. 3, the description is continued.

Figure 5:
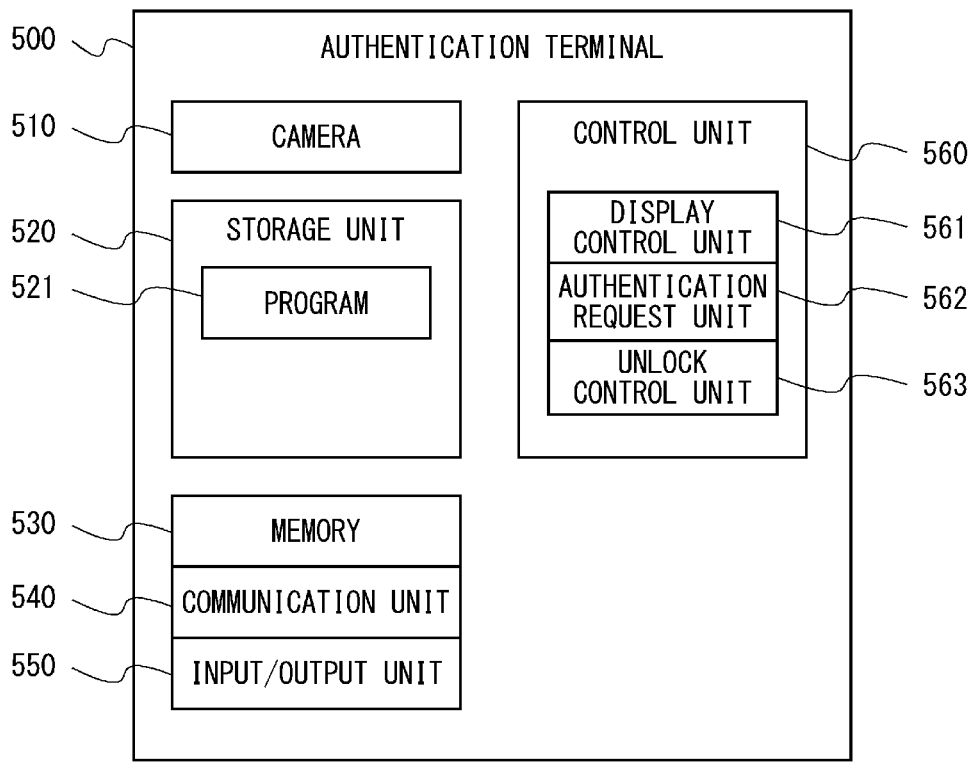
FIG. 5 is a block diagram showing a configuration of an authentication terminal according to the second example embodiment.

The authentication terminal 500 is an information processing apparatus installed at an entrance of a predetermined area and connected to the gate apparatus 601 also installed at the entrance. FIG. 5 is a block diagram showing a configuration of the authentication terminal 500 according to the second example embodiment. The authentication terminal 500 includes a camera 510, a storage unit 520, a memory 530, a communication unit 540, an input/output unit 550, and a control unit 560. The authentication terminal 500 may further include a motion sensor (not shown) for detecting moving objects such as people. The camera 510 is a photographing apparatus for capturing images under the control of the control unit 560. The storage unit 520 is an example of a storage device such as a flash memory. The storage unit 520 stores a program 521. The program 521 is a computer program in which processing including the check-in processing and the pre-entry authentication processing, which will be described later, is implemented. For example, the program 521 includes a client application corresponding to the facility usage control apparatus 300.

The memory 530 is a volatile storage device such as RAM (Random Access Memory) and is a storage area for temporarily holding information when the control unit 560 operates. The communication unit 540 is a communication interface with the network N. The input/output unit 550 includes a display apparatus (display unit) such as a screen and an input apparatus. The input/output unit 550 is, for example, a touch panel. The control unit 560 is a processor that controls hardware of the authentication terminal 500. The control unit 560 reads the program 521 from the storage unit 520 into the memory 530 and executes it. Thus, the control unit 560 implements the functions of a display control unit 561, an authentication request unit 562, and a lock control unit 563.

The display control unit 561 may control the input/output unit 550 to display the authentication result in response to the authentication request by the authentication request unit 562. For example, when the reservation confirmation and the check-in processing are completed in the facility usage control apparatus 300, the display control unit 561 may control the input/output unit 550 to display "Check-in completed", a room number, and so on.

When a person is detected, the authentication request unit 562 acquires an image captured by the camera 510, extracts a face area of the person detected from the captured image as a face image, and transmits an authentication request including the face image to the facility usage control apparatus 300. The authentication request unit 562 periodically analyzes a moving image captured by the camera 510, and may assume that a person is detected when it detects a candidate of a shape of a moving object such as a person. Alternatively, the authentication request unit 562 may assume that a person is detected when it receives information indicating that a person has been detected from the above-mentioned motion sensor. When a person is detected, the display control unit 561 may display a face capture field on the input/output unit 550. Next, the authentication request unit 562 acquires the image captured by the camera 510 when an outline of the user's face fits within the face capture field.

In the case of the authentication terminal 500-2, the authentication request unit 562 transmits a reservation confirmation request as the authentication request. The storage unit 520 of the authentication terminal 500-2 may store area information (room number) indicating the corresponding EV hall 620 (or entrance 610). In this case, the authentication request unit 562 may include the area information in the reservation confirmation request.

The storage unit 520 of each of the authentication terminals 500-3 and 500-4 further stores the corresponding room number. The authentication request unit 562 of each of the authentication terminals 500-3 and 500-4 transmits an unlock request including the face image and the room number as the authentication request.

The lock control unit 563, upon successful authentication in response to the authentication request, receives an unlock instruction from the facility usage control apparatus 300. Next, the lock control unit 563 outputs the unlock instruction to the corresponding gate apparatus. In response to this, the gate apparatus unlocks the gate.

Returning to FIG. 3, the description is continued.

The authentication apparatus 200 is an information processing apparatus that manages face feature information about a user and performs face authentication. In response to a face authentication request received from the outside, the authentication apparatus 200 compares the face image or the face feature information included in the request with the face feature information about the user, and returns the comparison result (authentication result) to a requester.

Figure 6:
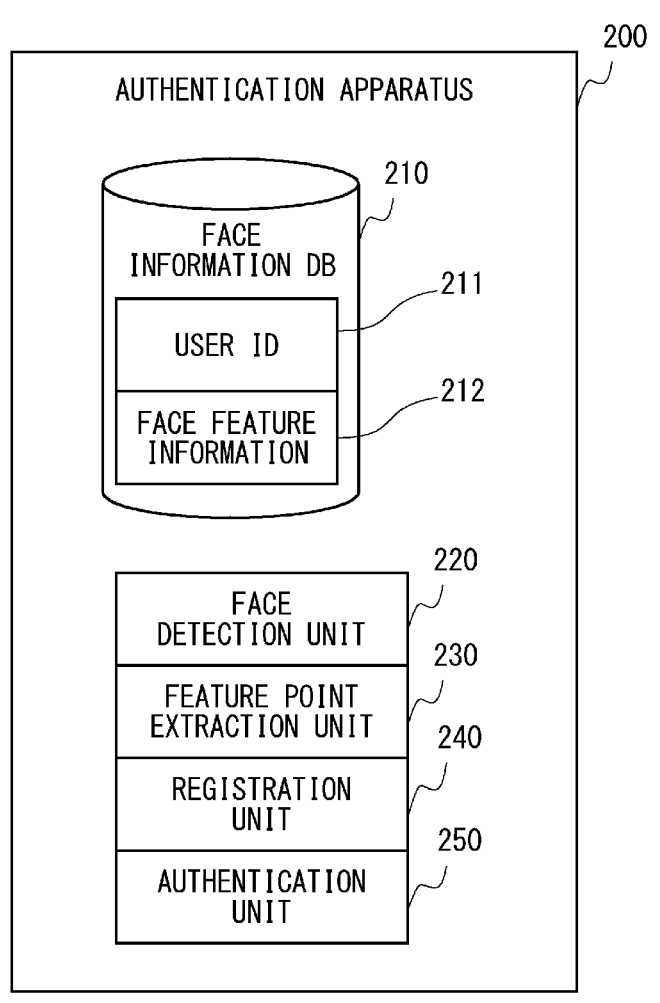
FIG. 6 is a block diagram showing a configuration of an authentication apparatus according to the second example embodiment.

FIG. 6 is a block diagram showing a configuration of the authentication apparatus 200 according to the second example embodiment. The authentication apparatus 200 includes a face information DB (DataBase) 210, a face detection unit 220, a feature point extraction unit 230, a registration unit 240, and an authentication unit 250. The face information DB 210 stores a user ID 211 and face feature information 212 about the user ID in association with each other. The face feature information 212 is a set of feature points extracted from the face image. The authentication apparatus 200 may delete the face feature information 212 from the face feature DB 210 in response to a request from the user or other parties corresponding to the face feature information 212. Alternatively, the authentication apparatus 200 may delete the face feature information 212 after a certain period of time has elapsed since the registration.

The face detection unit 220 detects a face area included in a registration image for registering the face information and outputs it to the feature point extraction unit 230. The feature point extraction unit 230 extracts feature points from the face area detected by the face detection unit 220 and outputs face feature information to registration unit 240. The feature point extraction unit 230 extracts the feature points included in the face image received from the facility usage control apparatus 300 or the like and outputs the face feature information to the authentication unit 250.

The registration unit 240 issues a new user ID 211 when registering the face feature information. The registration unit 240 associates the issued user ID 211 with the face feature information 212 extracted from the registered image and registers it in the face information DB 210. The authentication unit 250 performs face authentication using the face feature information 212. Specifically, the authentication unit 250 compares the face feature information extracted from the face image with the face feature information 212 in the face information DB 210. When the comparison indicates a match, the authentication unit 250 identifies the user ID 211 associated with the matched face feature information 212. The authentication unit 250 returns the result of the facial recognition as to whether the face feature information matches or not to the requester. The match or no match of the face feature information corresponds to success or failure of the authentication, respectively. The match of the face feature information means that the degree of similarity is greater than or equal to a threshold. The result of the facial recognition includes the identified user ID when the facial recognition is successful.

Returning to FIG. 3, the description is continued.

The reservation management apparatus 400 is an information processing apparatus for managing usage reservations of the hotel 600. The reservation management apparatus 400 may be installed inside the hotel 600. Alternatively, the reservation management apparatus 400 may be installed in an external data center or the like. In such a case, the reservation management apparatus 400 may also manage usage reservations of other facilities other than the hotel 600. The reservation management apparatus 400 may be redundant to a plurality of servers, and each function block may be implemented on a plurality of computers.

Figure 7:
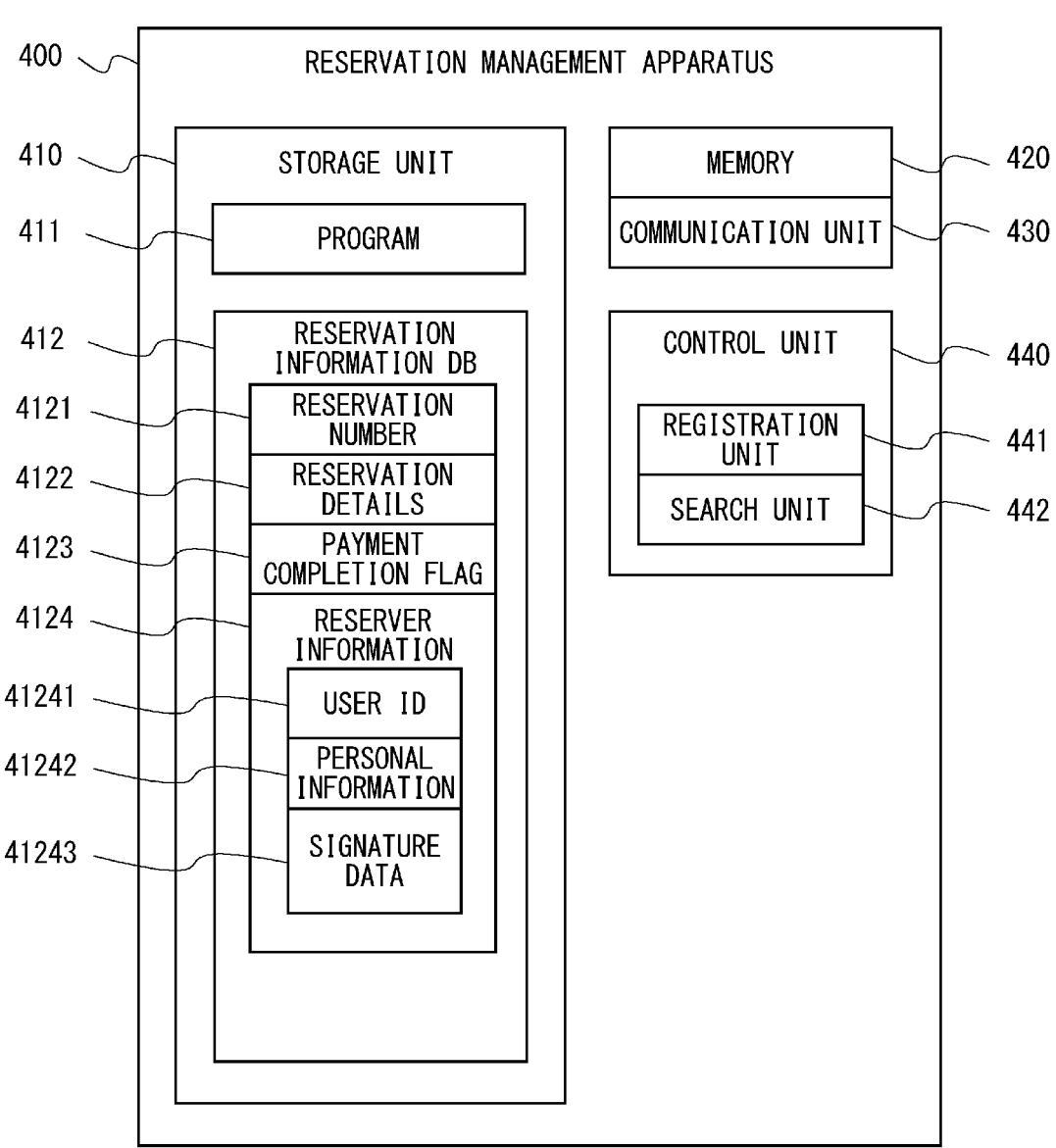
FIG. 7 is a block diagram showing a configuration of a reservation management apparatus according to the second example embodiment.

FIG. 7 is a block diagram showing a configuration of the reservation management apparatus 400 according to the second example embodiment. The reservation management apparatus 400 includes a storage unit 410, a memory 420, a communication unit 430, and a control unit 440. The storage unit 410 stores a program 411 and a reservation information DB 412. The program 411 is a computer program in which processing including reservation management processing and the like according to the second example embodiment is implemented.

The reservation information DB 412 is a database for managing the reservation information of the facility 600 and the usage procedure after the reservation. The reservation information DB 412 manages a reservation number 4121, reservation details 4122, a payment completion flag 4123, and reserver information 4124 in association with each other. The reservation number 4121 is an identification number for uniquely identifying the reservation information. The reservation details 4122 include a place of stay (hotel name, address, etc.), a length of stay, a room type, the number of guests, a usage fee, and so on. The payment completion flag 4123 is a flag indicating whether the payment of the usage fee has been completed. The reserver information 4124 is information about the reserver and an accompanying person. The reserver information 4124 is information in which a user ID 41241, personal information 41242, and signature data 41243 are associated with one another. For example, when the number of guests is plural (there is one or more accompanying persons in addition to the reserver), the reserver information 4124 associates a plurality of pairs of the user ID 41241 and the personal information 41242 with one piece of the signature data 41243 provided by the reserver. However, the signature data 41243 is not registered at the time of reservation and is registered during the check-in processing. The user ID 41241 is the identification information about the user (reserver, user, accompanying person). The user ID 41241 is the same as or uniquely corresponds to the user ID 211 associated with the face feature information 212 managed in the face information DB 210 of the authentication apparatus 200. Therefore, the reservation information DB 412 can be considered as information associated with the identity identification information for registration of the user through the user ID 41241. The personal information 41242 is the information including the name, address, telephone number, previous stay location, next stay location, payment information, and so on of the reserver. The signature data 41243 is electronic data when the user performs a signature input operation to the mobile terminal during the check-in processing. For example, as described above, the signature data 41243 indicates a trajectory of the position where the user has contacted the input/output unit 150 (touch panel) or image data of the signature or the like.

The memory 420 is a volatile storage device such as RAM, and is a storage area for temporarily holding information when the control unit 440 operates. The communication unit 430 is a communication interface with the network N.

The control unit 440 is a processor, i.e., a control apparatus that controls each component of the reservation management apparatus 400. The control unit 440 reads the program 411 from the storage unit 410 into the memory 420 and executes the program 411. Thus, the control unit 440 implements the functions of a registration unit 441 and a search unit 442.

The registration unit 441 receives the reservation registration request from the facility usage control apparatus 300 and performs reservation registration processing. The reservation registration request includes the user ID, the personal information, and the reservation information of the reserver.

The registration unit 441 checks the reservation information for any problem, and if there is no problem, issues the reservation number. Note that the registration unit 441 checks, for example, whether there is a room available in the hotel 600 according to the length of stay, the room type, and the number of guests indicated by the reservation information, and whether there is a problem with the personal information about the reserver. The registration unit 441 sets the reservation information in the reservation details 4122, and sets the payment completion flag 4123 as ON if the reservation information includes information indicating that the payment has been completed, whereas it sets the payment completion flag 4123 as OFF if information indicating that the payment has not been completed (e.g., when the payment is scheduled at check-in). The registration unit 441 associates the user ID 41241 of the reserver with the personal information 41242, forming the reserver information 4124. The registration unit 441 associates the issued reservation number 4121, the reservation details 4122, the set payment completion flag 4123, and the reserver information 4124 and registers them in the reservation information DB 412. When the registration unit 441 receives a reservation information update request including the reservation number, the room number, and the signature data, it associates the reservation number 4121, the room number, and the signature data 41243 to update the reservation information DB 412.

The search unit 442 receives the reservation confirmation request from the facility usage control apparatus 300 and performs reservation confirmation processing. The reservation confirmation request includes the reservation number and the user ID. However, the reservation confirmation request may include at least the user ID. The search unit 442 searches within the reservation information DB 412 for a record that includes the user ID 41241 included in the reservation confirmation request. The search unit 442 determines whether the user ID 4121 of the record that has been matched in the search matches the reservation number included in the reservation confirmation request. Alternatively, the search unit 442 searches within the reservation information DB 412 for a record that includes the reservation number 4121 included in the reservation confirmation request. The search unit 442 determines whether the reserver information 4124 of the record that has matched in the search includes the user ID 41242 included in the reservation confirmation request. Alternatively, the search unit 442 searches within the reservation information DB 412 for a record that includes the reservation number 4121 and the user ID 41241 included in the reservation confirmation request. Through any of these methods, the search unit 442 performs the reservation confirmation processing. When the reservation is confirmed, that is, when the record that has been matched in the search matches other information, the search unit 442 identifies the reservation details 4122 and the payment completion flag 4123 of the corresponding record, and returns the reservation confirmation result including the identified reservation details and the payment completion flag to the facility usage control apparatus 300. Alternatively, if the reservation is not confirmed, meaning that there is no corresponding record, the search unit 442 returns a reservation confirmation result including that information to the facility usage control apparatus 300.

Returning to FIG. 3, the description is continued.

The facility usage control apparatus 300 is an information processing apparatus for performing the facility usage reservation processing, the check-in processing, the pre-entry authentication processing, and so on. The facility usage control apparatus 300 is an example of the facility usage control apparatus 1 described above. The facility usage control apparatus 300 may be redundant to a plurality of servers, and each function block may be implemented on a plurality of computers.

Figure 8:
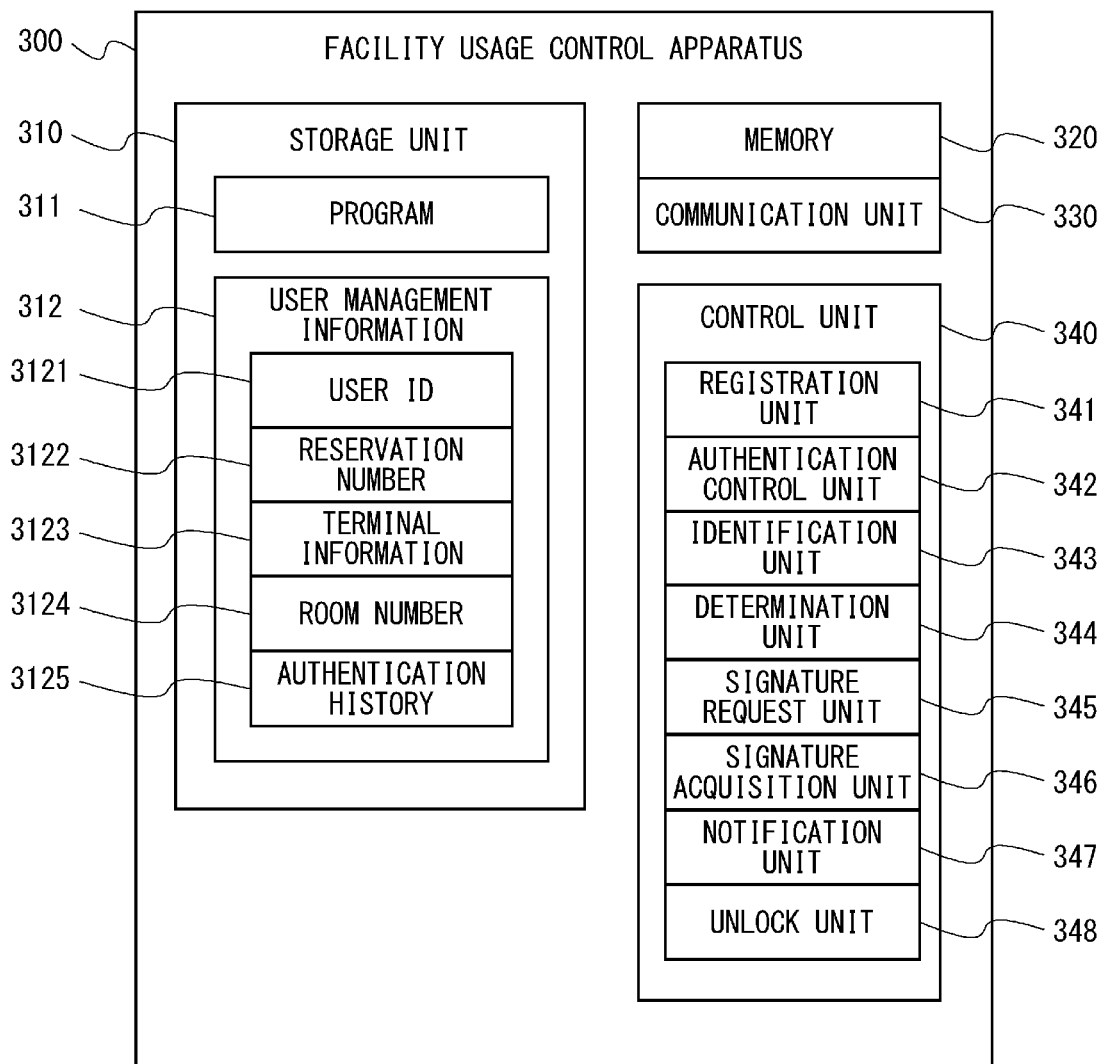
FIG. 8 is a block diagram showing a configuration of a facility usage control apparatus according to the second example embodiment.

FIG. 8 is a block diagram showing a configuration of the facility usage control apparatus 300 according to the second example embodiment. The facility usage control apparatus 300 includes a storage unit 310, a memory 320, a communication unit 330, and a control unit 340. The storage unit 310 is an example of a storage device such as a hard disk or a flash memory. The storage unit 310 stores a program 311 and user management information 312. The program 311 is a computer program in which processing including the facility usage reservation processing, the check-in processing, and the pre-entry authentication processing, and so on according to the second example embodiment is implemented.

The user management information 312 is information in which a user ID 3121, a reservation number 3122, terminal information 3123, a room number 3124, and an authentication history 3125 are associated with one another. The user management information 312 may not include the reservation number 3122. The user ID 3121 is identification information about the user (reserver, user, accompanying person). The user ID 3121 is the same as or uniquely corresponds to the user ID 211 associated with the face feature information 212 managed in the face information DB 210 of the authentication apparatus 200. Therefore, the user management information 312 can be considered as information associated with the identity identification information for registration of the user through the user ID 3121. The reservation number 3122 is an identification number for uniquely identifying the reservation information. The reservation number 3122 is the same or uniquely corresponds to the reservation number 4121 in the reservation information DB 412. As described above, the terminal information 3123 is information indicating a notification destination of the mobile terminal of the reserver. The room number 3124 is an example of the area information available to (i.e., permitted to be used by) the user in the facility. The room number 3124 is the room number of the guest room assigned to the user who is permitted for usage during the check-in processing. The room number 3124 may be assigned to the reserver at the time of reservation. The authentication history 3125 is a history of authentication at the time of entering and exiting the guest room corresponding to the assigned room number. The authentication history 3125 includes, for example, authentication date and time, the user ID that has been successfully authenticated.

The memory 320 is a volatile storage device such as RAM, and is a storage area for temporarily holding information when the control unit 340 operates. The communication unit 330 is a communication interface with the network N.

The control unit 340 is a processor, i.e., a control apparatus that controls each component of the facility usage control apparatus 300. The control unit 340 reads the program 311 from the storage unit 310 into the memory 320 and executes the program 311. Thus, the control unit 340 implements the functions of a registration unit 341, an authentication control unit 342, an identification unit 343, a determination unit 344, a signature request unit 345, a signature acquisition unit 346, a notification unit 347, and an unlock unit 348.

The registration unit 341 is an example of the registration unit 11 described above. The registration unit 341 performs the facility usage reservation processing. The registration unit 341 registers the face feature information for registration about the reserver (user) who makes a reservation to use the hotel 600, the user's mobile terminal, and the reservation information of the facility 600 in association with each other. Specifically, the registration unit 341 receives the reservation registration request including the face image, the personal information, the reservation information, and the terminal information about the reserver from the mobile terminal 100. In response to the reservation registration request, the registration unit 341 transmits a face information registration request to the authentication apparatus 200 and acquires the user ID as a registration result. Then, the registration unit 341 transmits the reservation registration request including the acquired user ID (i.e., user ID issued by the authentication apparatus 200), the personal information, and the reservation information to the reservation management apparatus 400 and receives a registration result (i.e., reservation number). Furthermore, the registration unit 341 registers the user management information 312 in which the user ID, the reservation number, and the terminal information are associated with each other. Additionally, the registration unit 341 returns the reservation number to the mobile terminal, which is the requester of the reservation registration request. Note that the registration unit 341 may also receive reservation registration request from an information processing apparatus other than the mobile terminals.

The registration unit 341 registers the signature data acquired by the signature acquisition unit 346 in association with the reservation information identified by the identification unit 343. Specifically, the registration unit 341 transmits the signature data to the reservation management apparatus 400 to add it to the reservation information DB 412 in association with the corresponding reservation number. The registration unit 341 also registers the room number assigned to the user who has registered the signature data in the user management information 312.

The authentication control unit 342 is an example of the authentication control unit 12 described above. The authentication control unit 342 controls face authentication, which is an example of biometric authentication, as the identity identification authentication. However, the authentication control unit 342 may control other biometric authentication or other identity identification authentication. The authentication control unit 342 controls face authentication for the face image included in the reservation confirmation request. That is, the authentication control unit 342 controls authentication using the identity identification information for registration and the identity identification information for authentication. Specifically, the authentication control unit 342 transmits a face authentication request including the face image to the authentication apparatus 200 and receives a face authentication result from the authentication apparatus 200. The authentication control unit 342 may detect the face area of the user from the face image and include an image of the face area in the face authentication request. Alternatively, the authentication control unit 342 may extract the face feature information from the face area and include the face feature information in the face authentication request.

After acquiring the signature data, the authentication control unit 342 controls authentication based on the identity identification information for authentication acquired from the user through the second authentication terminal installed at the entrance of the area (guest room or common space) available to the user (who has already checked in) inside the hotel 600. Specifically, the authentication control unit 342 controls authentication in response to the unlock request described above.

The identification unit 343 is an example of the identification unit 13 described above. When the face authentication result indicates success, the identification unit 343 identifies the user ID included in the face authentication result. The identification unit 343 also identifies the reservation number 3122 and the terminal information 3123 associated with the identified user ID 3121 from the user management information 312. By identifying the reservation number, the identification unit 343 can be regarded as identifying the reservation information. The identification unit 343 transmits the reservation confirmation request including the identified reservation number and the user ID to the reservation management apparatus 400. The reservation confirmation request may include at least one of the reservation number and the user ID. The identification unit 343 receives the reservation confirmation result from the reservation management apparatus 400.

The determination unit 344 is an example of the determination unit 14 described above. The determination unit 344 determines from the reservation confirmation result whether the reservation has been appropriately made or whether the payment of the usage fee has been completed for the appropriately made reservation. Thus, the determination unit 344 determines whether the user who has succeeded in face authentication can use the area such as the guest room in the hotel 600. For example, when the reservation details are included in the reservation confirmation result, the determination unit 344 determines that the user who has succeeded in face authentication can use the guest room in the hotel 600. Here, when the determination unit 344 determines, based on the identified reservation information, that the usage fee of the facility is unpaid, it may request the mobile terminal associated with the identity identification information for registration to pay the usage fee. For example, when the payment completion flag included in the reservation confirmation result indicates ON, the determination unit 344 determines that the user who has succeeded in face authentication can use the guest room in the hotel 600. On the other hand, when the payment completion flag included in the reservation confirmation result indicates OFF, the determination unit 344 transmits a payment request for the usage fee to the mobile terminal indicated by the identified terminal information. When the usage fee is paid through the mobile terminal, the determination unit 344 determines that the user can use the guest room in the hotel 600. Alternatively, the usage fee may be paid at the time of check-out. In this case, even if the determination unit 344 determines that the payment of the usage fee for the appropriate reservation is not completed for appropriately made reservation, it still allows access. The determination unit 344 subsequently determines whether payment for the usage fee is completed during the check-out processing for the user who has succeeded in authentication at the time of check-out. If payment for the facility usage fee is not completed, the determination unit 344 requests payment for the fee during check-out, as mentioned earlier.

The signature request unit 345 is an example of the signature request unit 15 described above. When the user is determined to have access to a guest room in the hotel 600, the signature request unit 345 transmits a signature request to the mobile terminal indicated by the identified terminal information.

The signature acquisition unit 346 is an example of the signature acquisition unit 16 described above. The signature acquisition unit 346 acquires the signature data input by the user to the mobile terminal for which the signature request has been received.

The facility usage control apparatus 300 may include an assignment unit that assigns a room number of the hotel 600 to a user who is determined to have access after acquiring the signature data.

After the signature data is acquired, the notification unit 347 notifies the mobile terminal of area information available to the user in the facility. Specifically, the notification unit 347 transmits the room number assigned to the user in the hotel 600 to the mobile terminal.

The unlock unit 348 unlocks the entrance when the authentication is successful. Specifically, the unlock unit 348 transmits an unlock instruction of the gate apparatus to the authentication terminal 500 when the user succeeds in face authentication, the reservation is confirmed, and the signature data is acquired.

Figure 9:
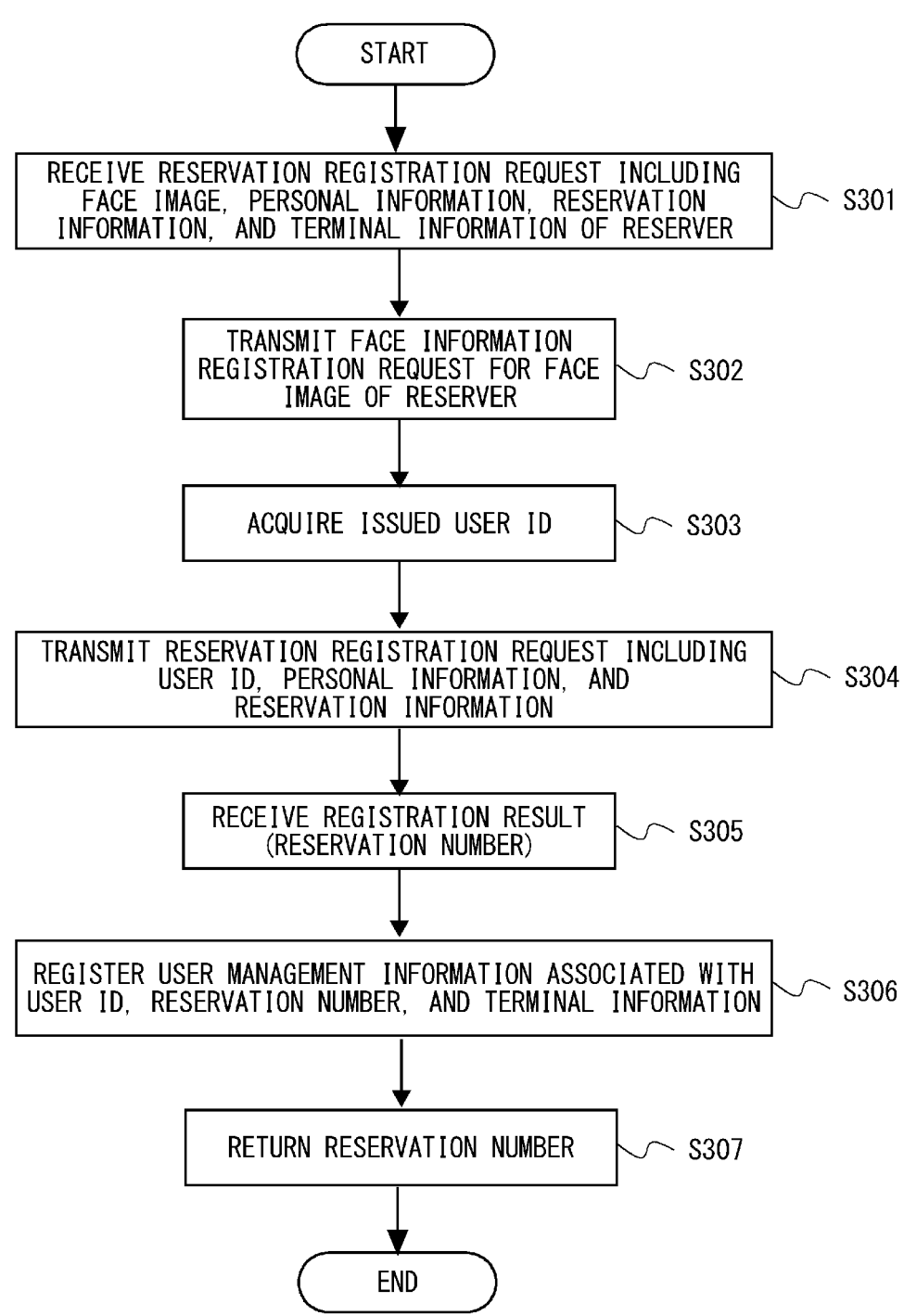
FIG. 9 is a flowchart showing a flow of facility usage reservation processing according to the second example embodiment.

FIG. 9 is a flowchart showing a flow of the facility usage reservation processing according to the second example embodiment. For example, the reserver U1 makes a reservation for staying at the hotel 600. At this time, the mobile terminal 100-1 acquires a face image of the reserver U1 using the camera 110 in response to an operation of the reserver U1. The mobile terminal 100-1 also receives the personal information about the reserver U1 input by the reserver U1 and the reservation information of the facility 600. The mobile terminal 100-1 acquires the terminal information about the mobile terminal 100-1. The mobile terminal 100-1 transmits the reservation registration request including the face image, the personal information, the reservation information, and the terminal information about the reserver U1 to the facility usage control apparatus 300 via the network N. In response to this, the registration unit 341 of the facility usage control apparatus 300 receives the reservation registration request from the mobile terminal 100-1 via the network N (S301).

Next, the registration unit 341 transmits the face information registration request for the face image included in the received reservation registration request to the authentication apparatus 200 (S302). For example, the registration unit 341 acquires the face image of the reserver U1 included in the reservation registration request, and transmits the face information registration request including the face image to the authentication apparatus 200 via the network N. In response to this, the authentication apparatus 200 performs face information registration processing.

Figure 10:
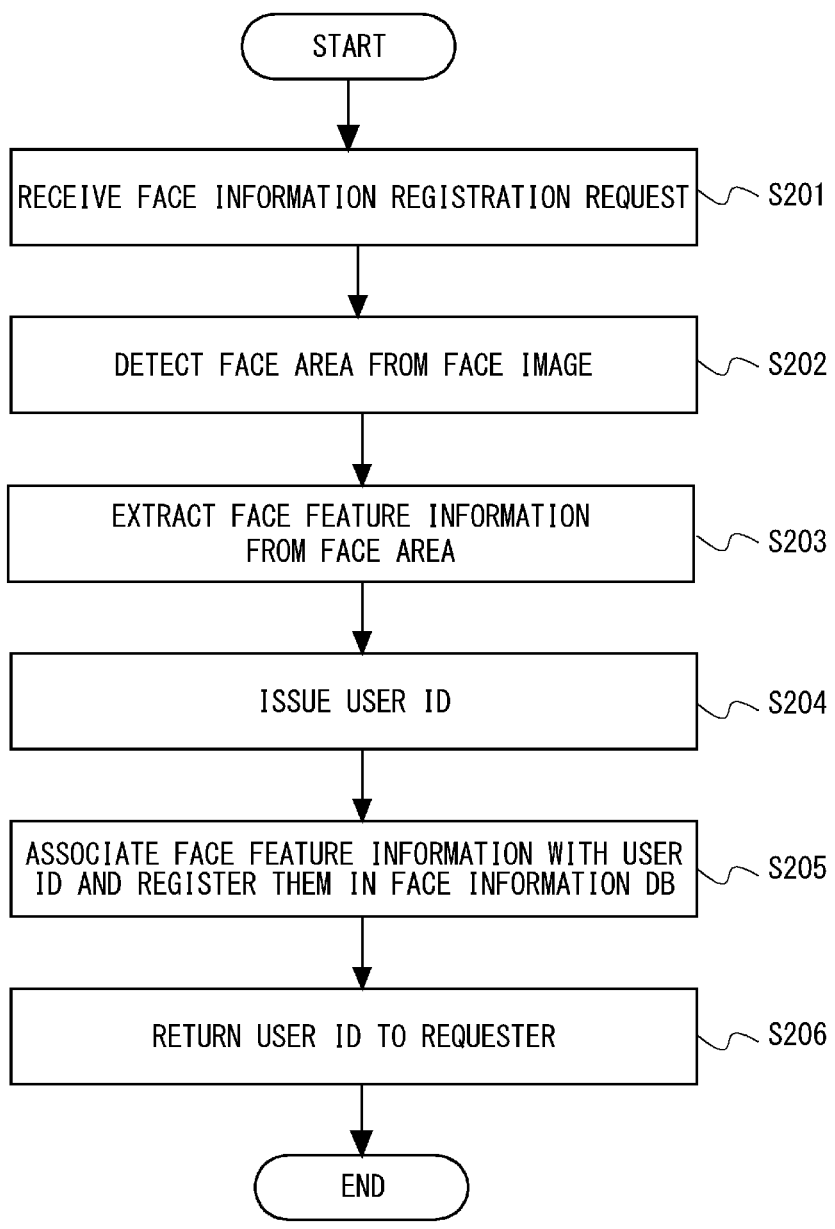
FIG. 10 shows flowchart showing a flow of face information registration processing performed by the authentication apparatus according to the second example embodiment.

FIG. 10 is a flowchart showing a flow of the face information registration processing performed by the authentication apparatus 200 according to the second example embodiment. First, the authentication apparatus 200 receives the face information registration request (S201). For example, the authentication apparatus 200 receives the face information registration request from the facility usage control apparatus 300 via the network N. Next, the face detection unit 220 detects the face area from the face image included in the face information registration request (S202). Next, the feature point extraction unit 230 extracts the feature points (face feature information) from the face area detected in Step S202 (S203). Next, the registration unit 240 issues the user ID 211 (S204). Next, the registration unit 240 associates the extracted face feature information 212 with the issued user ID 211 and registers them in the face information DB 210 (S205). After that, the registration unit 240 returns the issued user ID 211 to the requester (e.g., facility usage control apparatus 300) (S206). The authentication apparatus 200 may perform the face information registration processing in response to the face information registration request received from a certain information registration terminal. For example, the information registration terminal is an information processing apparatus such as a personal computer, a smartphone, or a tablet terminal. The information registration terminal may be the mobile terminal 100.

Returning to FIG. 9, the description is continued. The registration unit 341 of the facility usage control apparatus 300 acquires the issued user ID from the authentication apparatus 200 via the network N (S303). Next, the registration unit 341 transmits the reservation registration request including the acquired user ID, the personal information included in the reservation registration request, and the reservation information to the reservation management apparatus 400 via the network N (S304). In response to this, the reservation management apparatus 400 performs the reservation registration processing of the hotel 600 as described above.

Here, the facility usage control apparatus 300 or the reservation management apparatus 400 may request the hotel staff U3 to confirm or approve the reservation. For example, the facility usage control apparatus 300 may transmit a reservation approval request including the personal information and the reservation information to the mobile terminal 100-3 via the network N. In this case, the mobile terminal 100-3 displays the received personal information and reservation information on a screen and receives an approval input from the hotel staff U3. Next, the mobile terminal 100-3 returns a reservation approval to the facility usage control apparatus 300. If the reservation approval is obtained from the hotel staff U3, the facility usage control apparatus 300 may transmit the reservation registration request in Step S304 to the reservation management apparatus 400. Alternatively, after the reservation registration request is received from the facility usage control apparatus 300, the reservation management apparatus 400 may transmit the reservation approval request to the mobile terminal 100-3 and, if the reservation approval is obtained from the hotel staff U3, perform the reservation registration processing.

As described above, the reservation management apparatus 400 issues the reservation number at the time of reservation registration and registers the record related to the reservation number in the reservation information DB 412. At this time, the signature data 41243 is not registered in the record. Then, the reservation management apparatus 400 returns the registration result including the reservation number to the facility usage control apparatus 300 via the network N. Note that the reservation management apparatus 400 need not include the reservation number in the registration result. This is because the reservation information can be identified by the user ID that has succeeded in face authentication described later. When the reservation is not registered because the reservation is not approved or other reasons, the reservation management apparatus 400 returns the registration result including the information indicating that the reservation is not made to the facility usage control apparatus 300.

The registration unit 341 of the facility usage control apparatus 300 receives the registration result from the reservation management apparatus 400 via the network N (S305). Next, the registration unit 341 registers the user management information 312 that has been associated with the user ID acquired in Step S303, the reservation number received in Step S305, and the terminal information received in Step S301 (S306). Next, the registration unit 341 returns the registration result including the received reservation number to the mobile terminal 100-1 via the network N (S307). In response to this, the mobile terminal 100-1 stores the received reservation number 122 in the storage unit 120.

Figure 11:
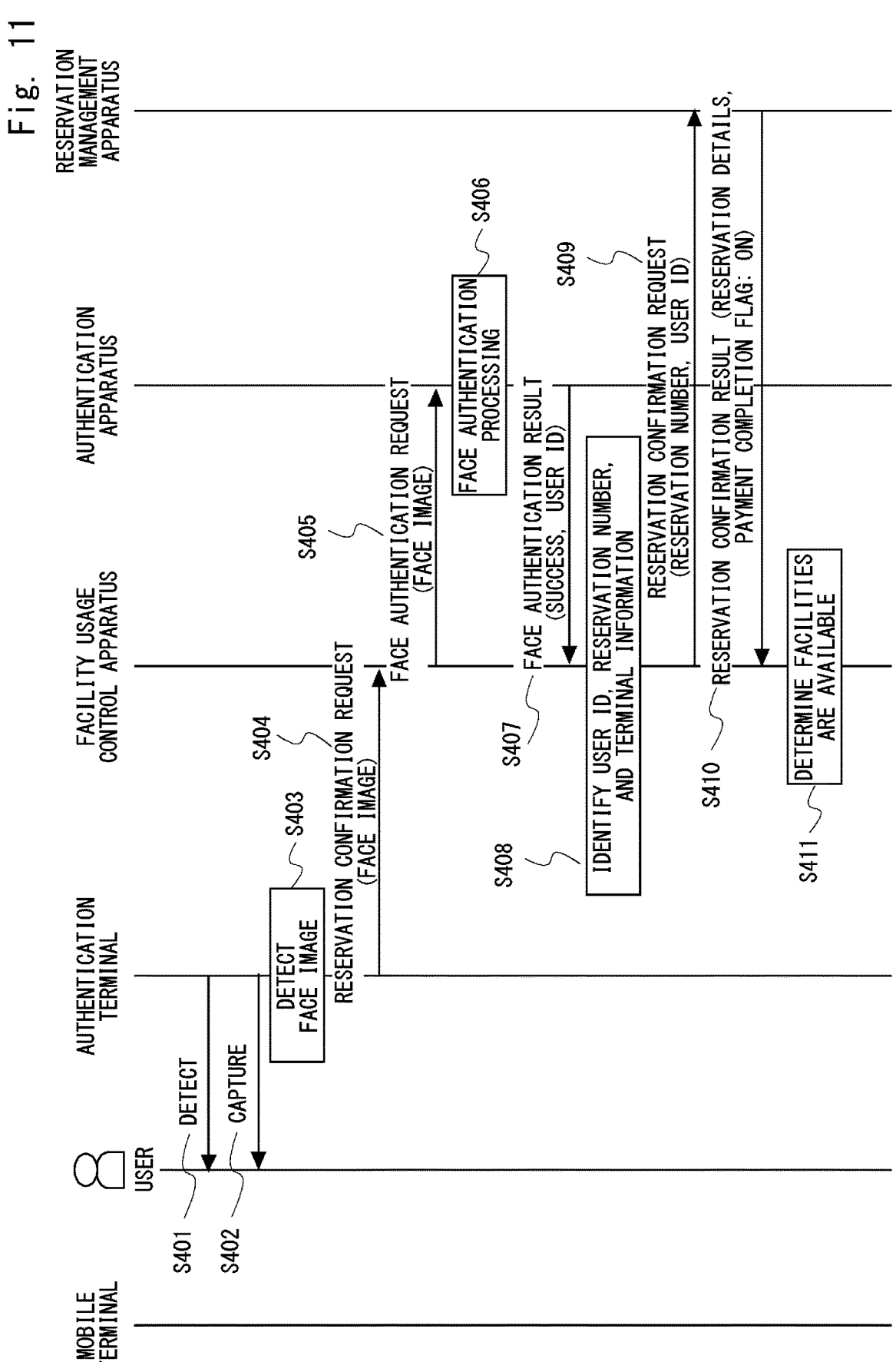
FIG. 11 shows a sequence diagram showing a flow of check-in processing (first half) according to the second example embodiment.

FIG. 11 is a sequence diagram showing a flow of the check-in processing (first half) according to the second example embodiment. It is assumed that the user U2 has already made a reservation at the hotel 600 through the facility usage reservation processing in FIG. 9, visited the hotel 600 on the start date of the reserved length of stay, and entered the entrance 610. Here, the authentication terminal 500-2 detects the user U2 (S401) and captures an image of the user U2 by the camera 510 (S402). In response to this, the authentication terminal 500-2 acquires the captured image of the user U2.

The authentication terminal 500-2 extracts the face area of the user U2 from the captured image as the face image (S403), and transmits the reservation confirmation request including the face image to the facility usage control apparatus 300 via the network N (S404). At this time, the authentication terminal 500-2 includes the area information (room number) of the restricted entry area, which is the EV hall 620, in the reservation confirmation request.

The authentication control unit 342 of the facility usage control apparatus 300 receives the reservation confirmation request from the authentication terminal 500-2 via the network N, includes the face image included in the reservation confirmation request in the face authentication request, and transmits the face authentication request to the authentication apparatus 200 via the network N (S405). In response to this, the authentication apparatus 200 performs the face authentication processing (S406).

Figure 12:
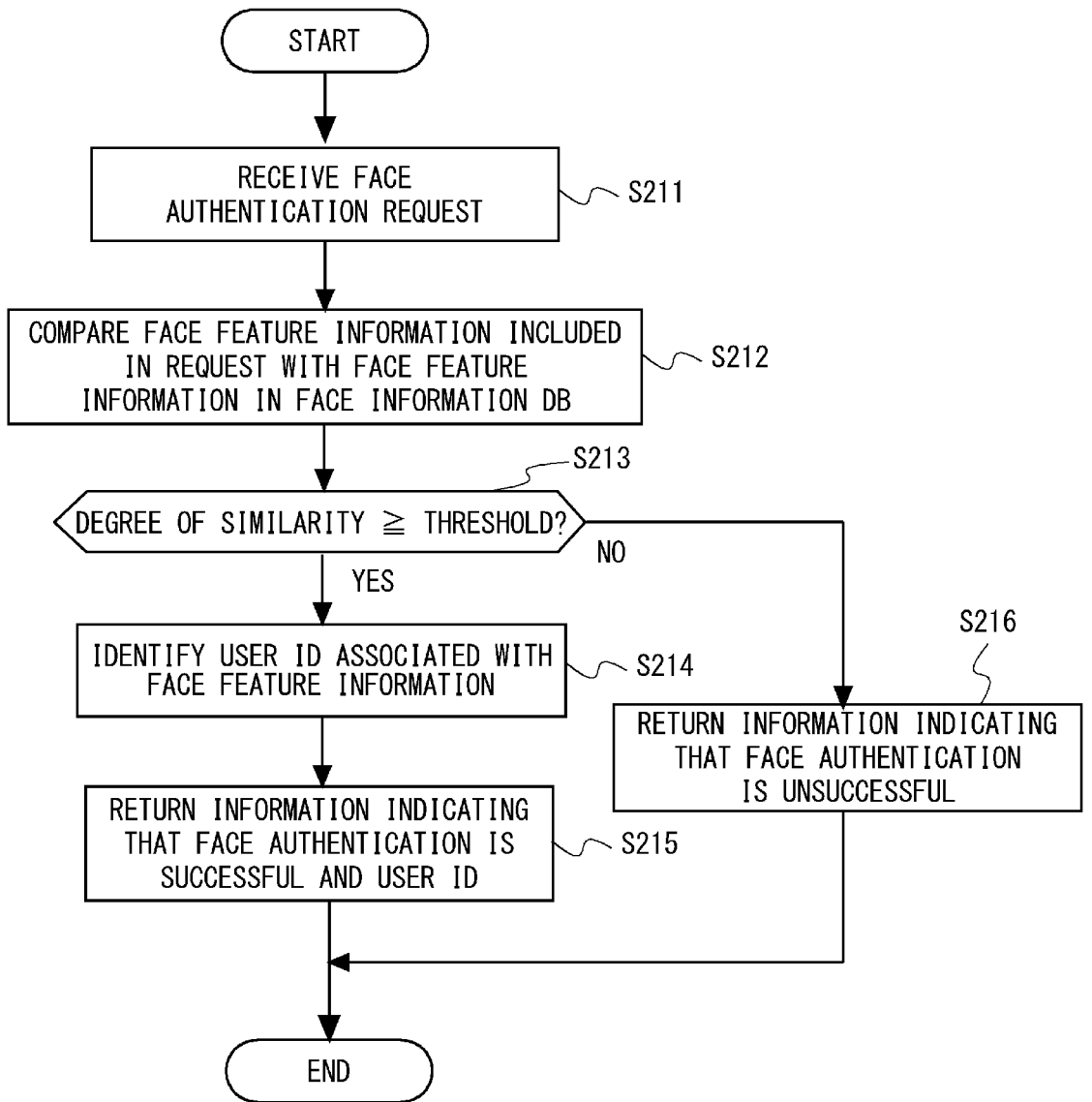
FIG. 12 is a flowchart showing a flow of face authentication processing performed by the authentication apparatus according to the second example embodiment.

FIG. 12 is a flowchart showing a flow of the face authentication processing performed by the authentication apparatus 200 according to the second example embodiment. First, the authentication apparatus 200 receives the face authentication request from the facility usage control apparatus 300 via the network N (S211). Note that the authentication apparatus 200 may receive the face authentication request from the authentication terminal 500-2 or the like. Next, the authentication apparatus 200 extracts the face feature information from the face image included in the face authentication request in the same manner as in the above-mentioned Steps S202 and S203. Next, the authentication unit 250 of the authentication apparatus 200 compares the face feature information extracted from the face image in the face authentication request with the face feature information 212 stored in the face information DB 210 (S212) and calculates a degree of similarity between these pieces of face feature information. The authentication unit 250 determines whether or not the degree of similarity is greater than or equal to the threshold (S213). When the face feature information matches, that is, when the degree of similarity of the face feature information is greater than or equal to the threshold, the authentication unit 250 identifies the user ID 211 associated with the face feature information 212 (S214). Next, the authentication unit 250 returns the face authentication result including the information indicating that the face authentication is successful and the identified user ID 211 to the facility usage control apparatus 300 via the network N (S215). When the degree of similarity is less than the threshold in Step S213, the authentication unit 250 returns the face authentication result including the information indicating that the face authentication is unsuccessful to the facility usage control apparatus 300 via the network N (S216).

Returning to FIG. 11, the description is continued. The authentication control unit 342 of the facility usage control apparatus 300 receives the face authentication result from the authentication apparatus 200 via the network N (S407). Here, it is assumed that the face authentication is successful, and the face authentication result includes the information indicating that the face authentication is successful and the user ID.

Next, the determination unit 344 determines whether or not the face authentication is successful from the received face authentication result. Here, it is determined that the face authentication is successful, and the identification unit 343 identifies the user ID included in the face authentication result. Next, the identification unit 343 identifies the reservation number 3122 and the terminal information 3123 associated with the identified user ID 3121 from the user management information 312 (S408). Next, the identification unit 343 transmits the reservation confirmation request including the identified reservation number and user ID to the reservation management apparatus 400 via the network N (S409). The reservation management apparatus 400 searches the reservation information DB 412 using at least one of the reservation number and the user ID included in the received reservation confirmation request, and returns the reservation confirmation result to the facility usage control apparatus 300 via the network N (S410). Here, it is assumed that the reservation confirmation result includes the reservation details and the payment completion flag, and that the payment completion flag is ON.

Next, the identification unit 343 of the facility usage control apparatus 300 receives the reservation confirmation result from the reservation management apparatus 400 via the network N. Based on the received reservation confirmation result, the determination unit 344 determines whether or not the user U2 who has succeeded in face authentication can use the guest room and other facilities of the hotel 600. Here, the determination unit 344 determines that the user U2 can use the guest room and other facilities of the hotel 600 (S411).

If the face authentication fails or the user is determined that he/she cannot use the guest room and other facilities of the hotel, the facility usage control apparatus 300 may return this information to the authentication terminal 500-2.

FIG. 13 is a sequence diagram showing a flow of the check-in processing (second half) according to the second example embodiment. After Step S411, that is, when the user U2 is determined that he/she can use the guest room and other facilities of the hotel, the signature request unit 345 transmits the signature request to the mobile terminal 100-2 indicated by the terminal information identified in Step S408 (S421). At this time, the signature request unit 345 may transmit a message indicating that "Signature request has been transmitted to the user's mobile terminal" to the authentication terminal 500-2 which is the requester of the reservation confirmation request in Step S404. Furthermore, the signature request unit 345 may include an input condition for signature in the message. The input condition for signature may be, for example, a deadline for completing signature input (e.g., within 60 seconds) or a requirement to complete signature input while the user is at the front desk. The authentication terminal 500-2 then displays the message received from the signature request unit 345 on the screen. That is, the authentication terminal 500-2 displays on the screen the information indicating that "Signature request has been transmitted to the user's mobile terminal" and the input condition for signature. Thus, the user U2 can know that the signature request has been transmitted to the user's mobile terminal 100-2 via the authentication terminal 500-2, the input condition for signature, and other information.

In response to this, the mobile terminal 100-2 receives the signature request from the facility usage control apparatus 300 via the network N and displays the signature input screen (S422). The signature request may be a notification to an application installed in the mobile terminal 100-2. When the mobile terminal 100-2 receives the signature request, a signature input field of the displayed signature input screen may be activated (may be ready to accept input).

FIG. 14 shows an example of a signature input screen 101 in a mobile terminal according to the second example embodiment. The signature input screen 101 includes a signature input field 102 and a signature registration button 103. The signature input field 102 is a field for accepting a signature input operation using the user U2's finger or similar means. The signature input field 102 displays a trajectory of the contact position of the user U2's finger or similar means. The signature registration button 103 is a button for accepting a signature registration operation from the user U2. When the signature registration button 103 is pressed, the mobile terminal 100-2 transmits the signature data, which is information indicating the trajectory of the signature input field 102 or a display image of the signature input field 102, to the facility usage control apparatus 300.

Returning to FIG. 13, the description is continued. The user U2 performs a signature input operation in the signature input field 102 of the mobile terminal 100-2 (S423) and presses the signature registration button 103. In response to this, the mobile terminal 100-2 transmits the signature data input in the signature input field 102 to the facility usage control apparatus 300 via the network N (S424).

In response to this, the signature acquisition unit 346 of the facility usage control apparatus 300 receives the signature data from the mobile terminal 100-2 via the network N and assigns a room number in the hotel 600 to the user U2 (S425). Here, it is assumed that the facility usage control apparatus 300 assigns a room number of the guest room 640. Next, the registration unit 341 transmits the reservation information update request including the reservation number, the assigned room number, and the received signature data to the reservation management apparatus 400 via the network N (S426). In response to this, the reservation management apparatus 400 performs reservation information update processing (S427). Specifically, the reservation management apparatus 400 associates the room number and signature data 41243 with the reservation number 4121 included in the received reservation information update request to update the reservation information DB 412. Note that the reservation information update request may not include the room number.

The notification unit 347 of the facility usage control apparatus 300 notifies the mobile terminal 100-2 identified in Step S408 of the room number assigned in Step S425 (S428). Specifically, the notification unit 347 transmits the room number to the mobile terminal 100-2 via the network N. In response to this, the mobile terminal 100-2 displays the received room number. Therefore, the user U2 can know that the room available to him/her is the guest room 640. The notification unit 347 may also transmit to the mobile terminal 100-2 a route to the room corresponding to the room number, an available entry time period, a check-out time, and so on. In response to this, the mobile terminal 100-2 displays the received route to the room, the available entry time period, the check-out time, and so on. The notification unit 347 may also transmit a completion notification of the check-in processing to the mobile terminal 100-2. In addition, the notification unit 347 may notify the mobile terminal 100-2 that facial authentication can be used to unlock the door of the guest room with the notified room number. For example, the mobile terminal 100-2 may display a check-in completion notification screen as shown below.

FIG. 15 shows an example of a check-in completion notification screen 101a displayed on the user's mobile terminal 100-2 according to the second example embodiment. The check-in completion notification screen 101a includes a room number 104, an available entry time period 105, a check-out time 106, and guidance information 107. The room number 104 indicates the room number assigned to the user. Here, it is shown that the room number 640 is indicated. The available entry time period 105 indicates a time period in which the user who is permitted to use the room number 104 can enter. Here, it is shown that the user can enter the room number 104 by facial recognition during the period of "X month 1st 15:00 to X month 2nd 10:00". The end time of the available entry time period 105 indicates the time when the user should leave the room number 104. The check-out time 106 indicates the time when the user should complete the check-out processing. The guidance information 107 is information on how to get to the room number 104, including directions and routes, presented in text or a map. If the room number is assigned before signing, the room number 104, the available entry time period 105, the check-out time 106, and the guidance information 107 may be displayed on the signature input screen of FIG. 14.

After Step S428, the unlock unit 348 of the facility usage control apparatus 300 transmits an unlock instruction of the gate apparatus to the authentication terminal 500-2. The authentication terminal 500-2 outputs the unlock instruction to the gate apparatus 621 in response to the received unlock instruction. In response to this, the gate apparatus 621 unlocks the gate. Therefore, the user U2 can enter the EV hall 620 and move to a floor where the guest room 640 is located using the elevator.

Further, the registration unit 341 registers the room number 3124 assigned in Step S425 in the user management information 312 in association with the user ID 3121 of the user U2 who has succeeded in face authentication. The registration unit 341 also registers the authentication history 3125 of the user U2 in the authentication terminal 500-2. In other words, the registration unit 341 registers the authentication history 3125 including the date and time when the user U2 has succeeded in face authentication and the area information (EV hole 620) of the authentication terminal 500-2 in the user management information 312 in association with the user ID 3121 of the user U2. Note that the registration unit 341 may register the received signature data in association with the user ID 3121 of the user U2 who has succeeded in facial authentication in the user management information 312. Additionally, the registration unit 341 may register the face image used for the successful facial recognition alongside the user management information 312.

After Step S410, the facility usage control apparatus 300 may request the hotel staff U3 to confirm the reservation details or to approve the availability of the reservation. For example, the facility usage control apparatus 300 may transmit a usage permission request including the face image of the user U2, the reservation details, and the payment completion flag to the mobile terminal 100-3 via the network N. In this case, the mobile terminal 100-3 displays the received face image, the reservation details, and the payment completion flag on the screen and receives an input of the availability from the hotel staff U3. For example, the mobile terminal 100-3 may display a usage approval screen as described later. Then, the mobile terminal 100-3 returns a result of the availability to the facility usage control apparatus 300. If the hotel staff U3 responds with approval, the facility usage control apparatus 300 determines that the guest room and other facilities of the hotel are available to the user U2. On the other hand, if the hotel staff U3 responds with decline, the facility usage control apparatus 300 determines that the guest room and other facilities of the hotel are unavailable to the user U2. Note that the facility usage control apparatus 300 may perform the determination in Step S411 without requesting confirmation of the reservation details and approval of availability from the hotel staff U3.

Figure 16:
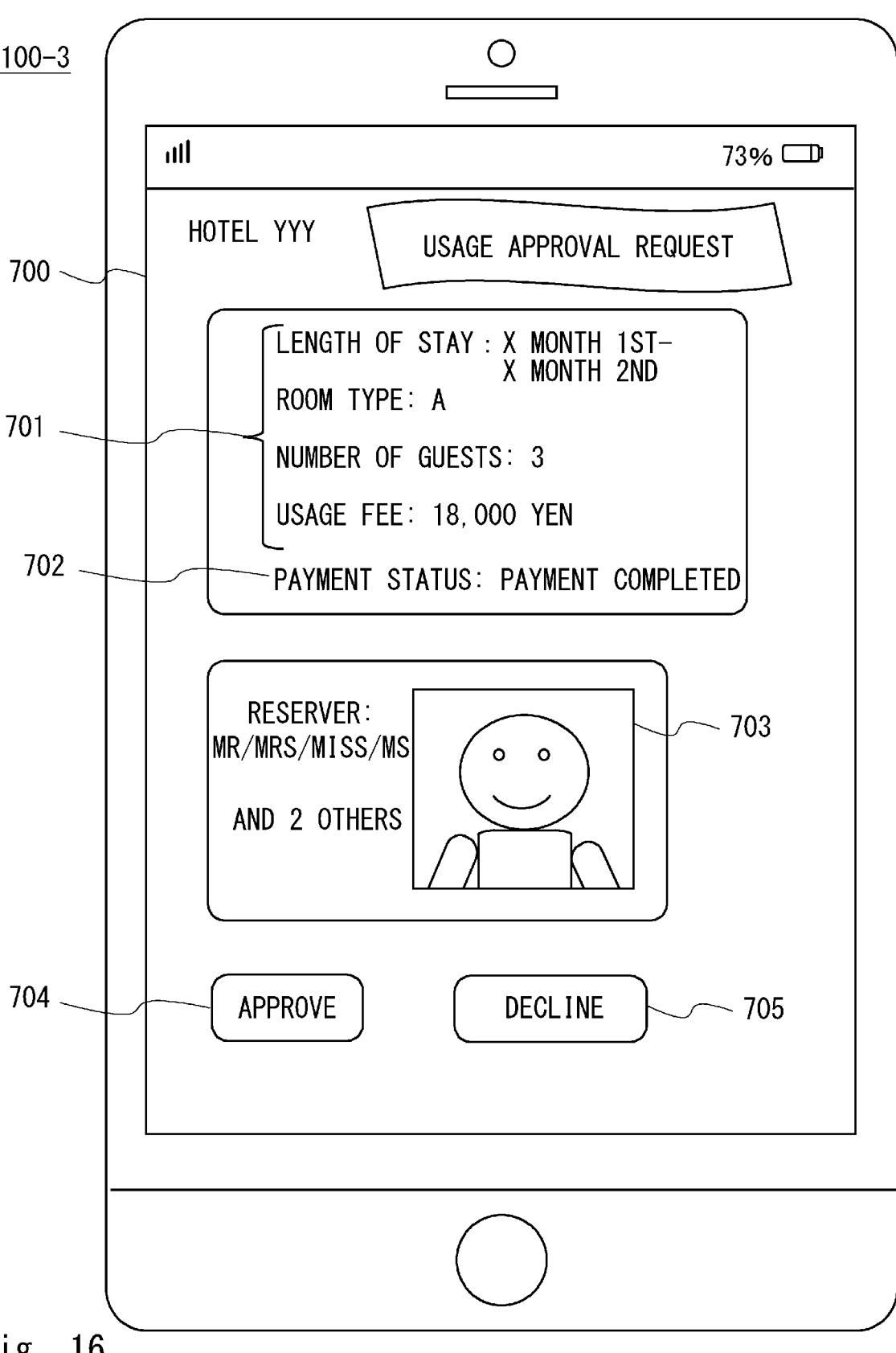
FIG. 16 shows an example of a usage approval screen displayed on a mobile terminal of a hotel staff according to the second example embodiment.

FIG. 16 shows an example of a usage approval screen 700 displayed on the mobile terminal 100-3 of the hotel staff U3 according to the second example embodiment. The usage approval screen 700 includes reservation details 701, a payment status 702, a face image 703 of a reserver who has made the reservation, an approve button 704, and a decline button 705. The reservation details 701 show the details of the reservation made by the reserver (user) who has made the reservation who has succeeded in face authentication. For example, the reservation details 701 include the length of stay, the room type, the number of guests, the usage fee, and so on. The payment status 702 indicates the details of the payment completion flag. In this example, the payment completion flag is ON and "payment completed" is displayed. The face image 703 of the reserver indicates a face image captured by the reserver (user) at the time of reservation registration or authentication. The approve button 704 is a button for accepting the information that the hotel staff U3 has determined that the guest room and other facilities of the hotel are available to the user. When the approve button 704 is pressed, the mobile terminal 100-3 transmits the information indicating approval from the hotel staff U3 to the facility usage control apparatus 300. The decline button 705 is a button for accepting the information indicating that the hotel staff U3 determines that the guest room and other facilities of the hotel are unavailable. When the decline button 705 is pressed, the mobile terminal 100-3 transmits information indicating decline from the hotel staff U3 to the facility usage control apparatus 300.

In Step S425, the facility usage control apparatus 300 may accept the room number assigned by the hotel staff U3. For example, the facility usage control apparatus 300 may transmit a room assignment request including the face image, the reservation details, and the signature data of the user U2 to the mobile terminal 100-3 via the network N. In this case, the mobile terminal 100-3 displays the received face image, the reservation details, and the signature data on a screen and receives the input of the room number from the hotel staff U3. The mobile terminal 100-3 returns the room number to the facility usage control apparatus 300. For example, the mobile terminal 100-3 may display a room number assignment screen as described later.

Figure 17:
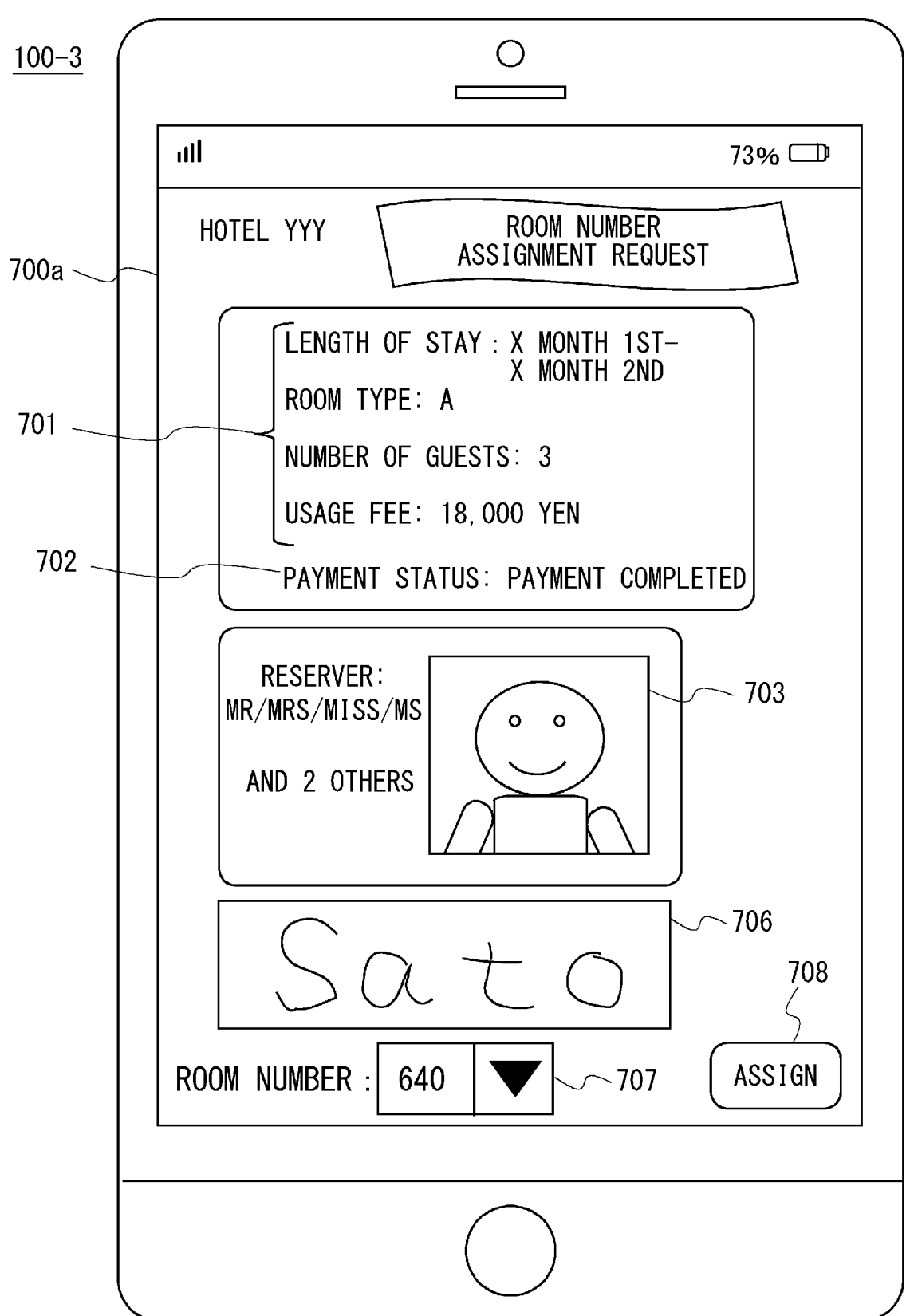
FIG. 17 shows an example of a room number assignment screen displayed on a mobile terminal of a hotel staff according to the second example embodiment.

FIG. 17 shows an example of a room number assignment screen 700a displayed on the mobile terminal 100-3 of the hotel staff U3 according to the second example embodiment. The room number assignment screen 700a includes reservation details 701, the payment status 702, the face image 703 of the reserver, signature data 706, a room number selection field 707, and an assignment button 708. The signature data 706 is acquired by the facility usage control apparatus 300 from the mobile terminal 100-2. The room number selection field 707 is a field for accepting selection of a room number by the hotel staff U3. The hotel staff U3 visually recognizes the signature data 706, operates the room number selection field 707 in consideration of the room type and the number of guests in the reservation details 701, and the available rooms in the hotel 600 on the day of check-in, and selects a room number to be assigned to the reserver. The room number selection field 707 may allow the user to select from a list of room numbers narrowed down based on the room type and the number of guests specified in the reservation details 701 from the available room information at the hotel 600 on the day of check-in. The assignment button 708 is a button for accepting the assignment of the room number selected by the hotel staff U3. When the assignment button 708 is pressed, the mobile terminal 100-3 transmits the room number displayed (selected) in the room number selection field 707 to the facility usage control apparatus 300.

Furthermore, after the signature request is transmitted in Step S421, if the signature data cannot be acquired by the signature acquisition unit 346 from the mobile terminal 100-2, to which the signature request has been transmitted, within a predetermined time period (deadline for completing signature input), the signature request unit 345 may notify the mobile terminal 100-2 accordingly. This can assist user U2 in properly inputting the signature. Alternatively, in this case, the notification unit 347 may notify the mobile terminal 100-3 that the signature data could not be acquired within a predetermined time period. This makes it easier for the hotel staff U3 to support the user U2. Furthermore, the notification unit 347 may also transmit to the mobile terminal 100-3 a notification including the face image of the user who has succeeded in face authentication, reservation details, and so on. This makes it easier for the hotel staff U3 to identify the user U2 and communicate with him/her more easily. Additionally, this enables the hotel staff U3 to provide more appropriate support to the user U2. Furthermore, both the signature request unit 345 and the notification unit 347 may operate concurrently to transmit the aforementioned notification.

The hotel 600 may have the authentication terminal 500 or similar devices installed in various locations within the facility, or it may have motion sensors and surveillance cameras. For example, the authentication terminal 500 or the like may be installed in a corridor on a floor such as the EV hall 620 or the guest room 630. In such a case, the authentication terminal 500 or the like extracts a face image from an image captured by a camera when a person is detected by the motion sensor or the like, and transmits an authentication request including the face image to the facility usage control apparatus 300. In response to the authentication request, the facility usage control apparatus 300 controls face authentication as described above and identifies a person corresponding to the face image. At this time, when it is determined that the identified person is the reserver who has made the reservation at the hotel 600, the facility usage control apparatus 300 can identify that the reserver who has made the reservation is present at a predetermined place (near the installation position of the authentication terminal 500) in the hotel 600 (the current position of the reserver who has made the reservation).

Alternatively, the hotel 600 may have sensors equipped with near-field communication functions installed at various locations within the facility. For example, the sensors may be placed in areas like the EV Hall 620 or the hallways of floors with guest rooms 630, and so forth. In such cases, these sensors use near-field communication to acquire the terminal information from the mobile terminals 100 within a predetermined range and then transmit the authentication request including the acquired terminal information to the facility usage control apparatus 300. The facility usage control apparatus 300 can refer to the user management information 312 to identify the user ID 3121 (person) associated with the terminal information 3123 included in the authentication request. That is, the facility usage control apparatus 300 can determine whether or not a holder of the mobile terminal 100 detected by the sensor is the reserver who has reserved the hotel 600. If it is determined that the identified person is the reserver who has reserved the hotel 600, the facility usage control apparatus 300 can determine that the reserver who has reserved the hotel 600 is present at a predetermined location within the hotel 600 (near the location where the sensor is installed), i.e., the current location of the reserver who has reserved the hotel.

When it is determined that the reserver is present at a predetermined location within the hotel 600 as described above, the facility usage control apparatus 300 confirms whether or not the reserver has completed the signature. For instance, the facility usage control apparatus 300 can refer to the user management information 312 to confirm whether or not the reserver has completed the signature by confirming both the authentication history 3125 and the room number 3124 have been assigned. Alternatively, the facility usage control apparatus 300 may inquire whether the reserver's signature data has been stored in the reservation management apparatus 400. If the reserver has not completed the signature, the notification unit 347 may notify the mobile terminal 100 of the reserver that the signature has not been completed. Alternatively, if the reserver has not completed the signature, the notification unit 347 may notify the mobile terminal 100-3 of the hotel staff U3 of the information. Furthermore, the notification unit 347 may also transmit to the mobile terminal 100-3 a notification including the face image of the reserver, reservation details, and so on. This makes it easier for the hotel staff U3 to identify the user U2 and communicate with him/her more easily. Additionally, this enables the hotel staff U3 to provide more appropriate support to the user U2. Furthermore, both the signature request unit 345 and the notification unit 347 may operate concurrently to transmit the aforementioned notification.

Figure 18:
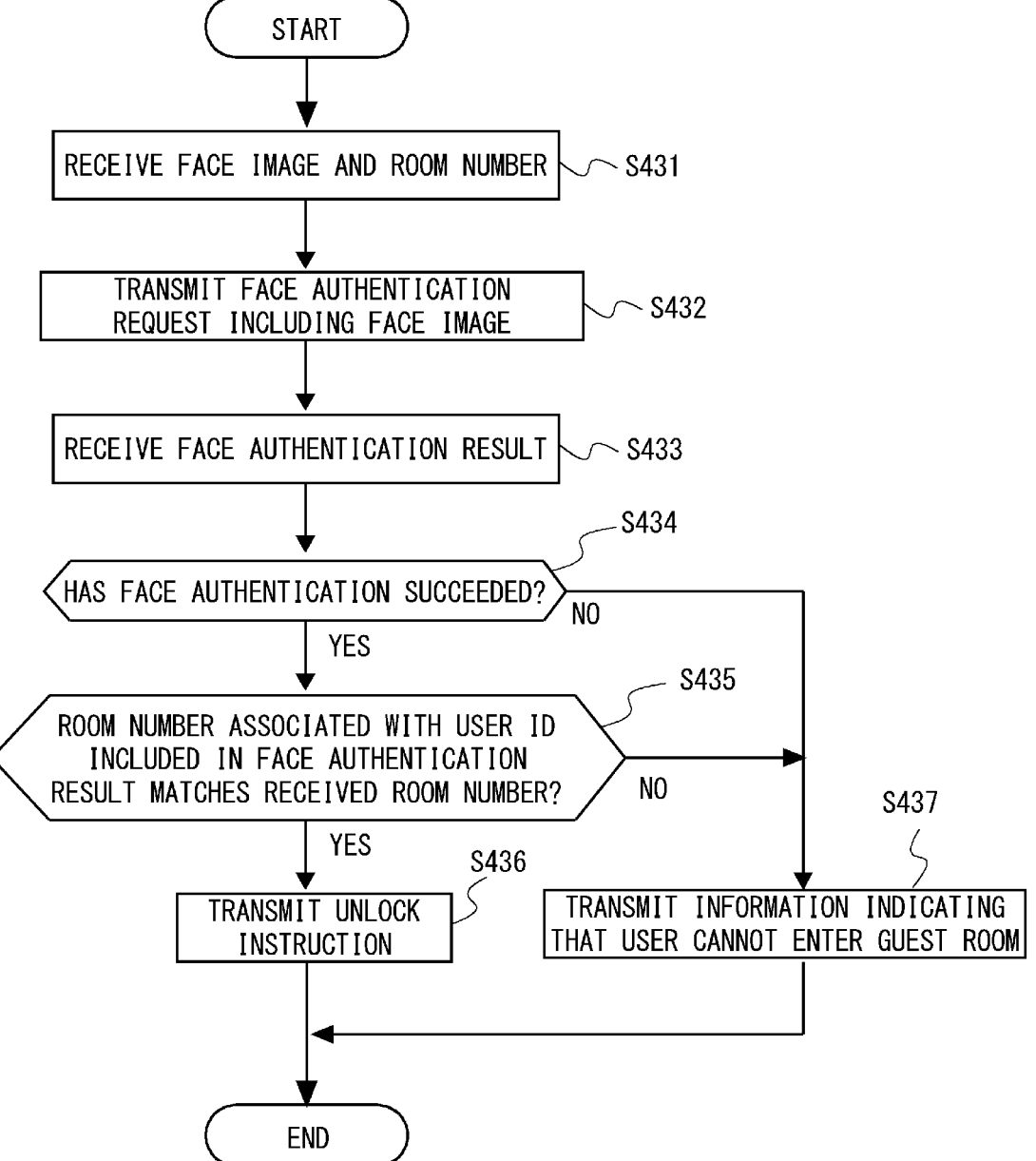
FIG. 18 is a flowchart showing a flow of the pre-entry authentication processing according to the second example embodiment.

FIG. 18 is a flowchart showing a flow of the pre-entry authentication processing according to the second example embodiment. As a prerequisite, it is assumed that the user U4 has been assigned the guest room 640 through the check-in processing as shown in FIGS. 11 and 13, and has arrived at the entrance of the guest room 640, where the authentication terminal 500-4 is installed. Here, the authentication terminal 500-4 detects the user U4, captures the user U4 using the camera 510, extracts the face image from the captured image, and transmits an unlock request including the face image and the room number of the guest room 640 to the facility usage control apparatus 300 via the network N.

In response, the authentication control unit 342 of the facility usage control apparatus 300 receives an unlock request including the face image and the room number from the authentication terminal 500-4 via the network N (S431). Next, the authentication control unit 342 includes the face image included in the unlock request in the face authentication request and transmits the face authentication request to the authentication apparatus 200 via the network N (S432). The authentication control unit 342 receives the face authentication result from the authentication apparatus 200 via the network N (S433).

Next, the determination unit 344 determines whether or not the face authentication has succeeded from the received face authentication result (S434). When the face authentication has succeeded (YES in S434), the determination unit 344 determines whether or not the received room number matches the room number associated with the user ID included in the face authentication result (S435). When the room numbers match (YES in S435), the unlock unit 348 transmits an unlock instruction of the gate apparatus 641 to the authentication terminal 500-4. The authentication terminal 500-4 outputs the unlock instruction to the gate apparatus 641 in response to the received unlock instruction. In response, the gate apparatus 641 unlocks the gate, allowing the user U4 to enter the guest room 640.

The registration unit 341 registers the authentication history 3125 of the user U4 in the authentication terminal 500-4. That is, the registration unit 341 registers the authentication history 3125 including the date and time when the user U4 has succeeded in face authentication and the room number (guest room 640) of the authentication terminal 500-4 in the user management information 312 in association with the user ID 3121 of the user U4.

In addition, the user U2 or the like may use face authentication through the authentication terminal 500-2 for the check-out procedure. In this case, the authentication terminal 500-2 transmits a check-out request including the face image to the facility usage control apparatus 300. The facility usage control apparatus 300 performs the check-out processing for the user ID and the reservation number identified based on the face image included in the check-out request. Then, the facility usage control apparatus 300 may notify the identified mobile terminal 100 that the guest room and other facilities of the hotel 600 can no longer be used due to the completion of the check-out processing. Additionally, if the payment of the usage fee has not been completed at the time of check-out, the facility usage control apparatus 300 may prompt the user U2 to pay the usage fee.

In this way, the second example embodiment can produce the following effects in addition to the effects mentioned in the first example embodiment described above. For example, by storing the signature data of the user U2 who has come to the entrance 610 at the time of check-in in the reservation information DB 412, it is possible to electronically record the check-in processing on the hotel 600 side. Furthermore, since the user can be identified by biometric authentication using biometric information automatically acquired from the user U2, the hotel 600 side can confirm and identify the reservation information without presenting the reservation information such as the user's reservation number. In addition, even if the usage fee is not paid at the time of reservation, contactless payment can be made at the time of check-in, which is highly convenient for the user and the hotel side. Additionally, the user is notified of the room number at the time of check-in, making it easy to locate his/her assigned room. Moreover, the hotel can also assign rooms dynamically, so that guest rooms can be managed flexibly. By authenticating a user using biometric information authenticated at check-in when he/she attempts to enter the guest room, security can be enhanced. In addition, in the second example embodiment, authentication of the individual is performed using biometric information and identity identification information acquired from the user through the authentication terminal installed in the facility. Successful authentication, coupled with reservation confirmation, triggers a signature request to be transmitted. In other words, the user is prompted to provide his/her signature only when he/she is confirmed to be physically present at the facility. After the signature data is acquired, the room number is assigned, and the check-in is completed. Check-in cannot be completed solely through the user's mobile terminal 100. For example, the user cannot complete check-in remotely using the mobile terminal 100. Therefore, security is ensured, and it can be ensured that the user is actually present at the facility. Note that the facility usage control apparatus 300 may also request location information (GPS information, etc.) from the mobile terminal during the signature request. The facility usage control apparatus 300 may acquire the location information together with the signature data from the mobile terminal to which the request is made, and complete the check-in when the location information indicates that the mobile terminal is within the facility. That is, the facility usage control apparatus 300 may cancel the check-in processing when the location information acquired from the mobile terminal to which the request is made does not indicate that it is within the facility. Thus, unauthorized check-in can be more reliably prevented.

The camera 510 of the authentication terminal 500 may be a thermal camera. The thermal camera is an apparatus including a photographing apparatus and a measuring apparatus of the body surface temperature. The thermal camera measures the temperature in a photographing target area, generates a thermography image showing a distribution of the temperature, and transmits an authentication request including the thermography image together with the face image to the facility usage control apparatus 300. The determination unit 344 of the facility usage control apparatus 300 compares the face image included in the received authentication request with the thermography image, and acquires the body surface temperature of the user's face area. Here, the body surface temperature is an example of the physical condition information acquired from the user through the first authentication terminal. The determination unit 344 may consider the body surface temperature to determine the availability of the facility. For example, even if the reservation of the user who has succeeded in face authentication is appropriately made, if the body surface temperature is higher than or equal to a predetermined value, the facility may be deemed unavailable. Thus, the use of the facility can be suppressed while detecting a person who is not in good physical condition or who is likely to be infected with infectious diseases. Therefore, the spread of infectious diseases can be suppressed.

In this example embodiment, the reservation information DB 412 of the reservation management apparatus 400 may be managed by the facility usage control apparatus 300. For example, the storage unit 310 of the facility usage control apparatus 300 may further store data equivalent to the reservation information DB 412. In this case, the reservation management apparatus 400 may not be used.

The signature request unit 345 of the facility usage control apparatus 300 may transmit the signature request to the authentication terminal 500-2 via the network N. In this case, the authentication terminal 500-2 transmits the signature request to the mobile terminal 100-2 using near-field communication or the like. When the authentication terminal 500-2 receives the signature data from the mobile terminal 100-2 using near-field communication or the like, it transmits the signature data to the facility usage control apparatus 300 via the network N.

Third Example Embodiment

A third example embodiment is a modified example of the second example embodiment as described above. The third example embodiment uses code information for identifying a reservation number and a user ID as identity identification information. Since a configuration of the facility usage control system according to the third example embodiment is the same as that shown in FIG. 3, the following description will focus on the differences, and redundant components will not be illustrated or described.

Figure 19:
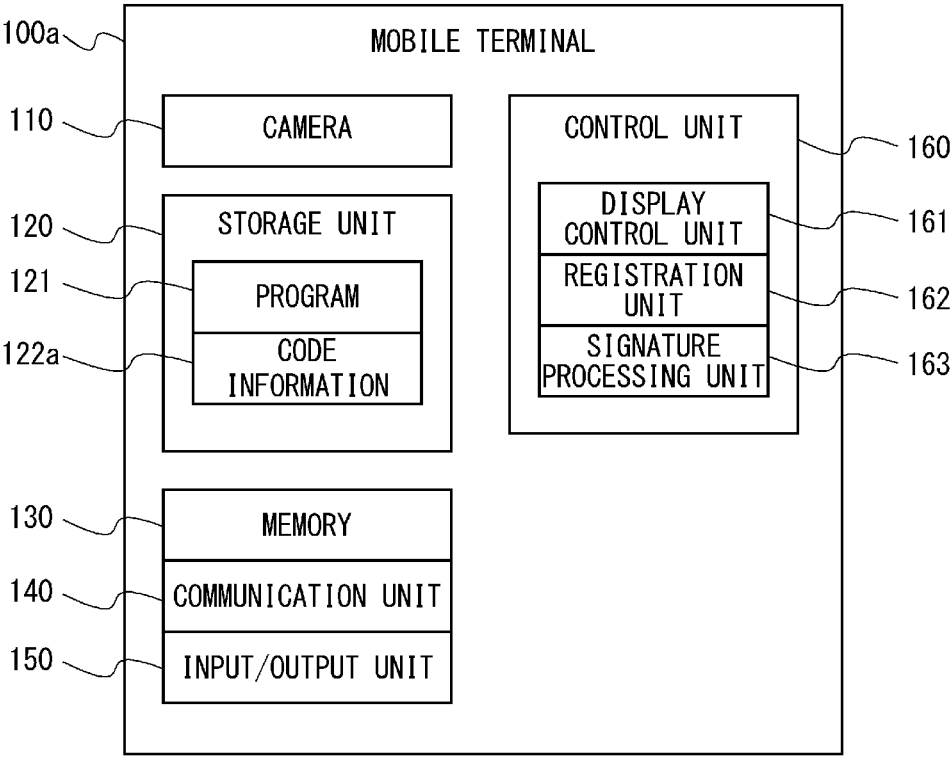
FIG. 19 is a block diagram showing a configuration of a mobile terminal according to a third example embodiment.

FIG. 19 is a block diagram showing a configuration of a mobile terminal 100a according to the third example embodiment. The mobile terminal 100a is a version of the mobile terminal 100 shown in FIG. 4, where the reservation number 122 is replaced with code information 122a. The code information 122a is coded information including the reservation number and the user ID that has been subjected to a predetermined conversion. The code information 122a may be a one-dimensional code or a two-dimensional code, for example, a bar code or a QR (Quick Response) code (registered trademark).

The registration unit 162 transmits a reservation registration request including personal information, reservation information, and terminal information about a reserver or the like without including a face image to the facility usage control apparatus 300. Next, the registration unit 162 receives the code information from the facility usage control apparatus 300 via the network N and registers the code information 122a in the storage unit 120.

In response to the user's operation, the display control unit 161 reads the code information 122a from the storage unit 120 and controls the input/output unit 150 to display the code information 122a. As a result, the user can have the authentication terminal 500 scan the code information 122a displayed on the input/output unit 150 to confirm identification and reservation information.

Figure 20:
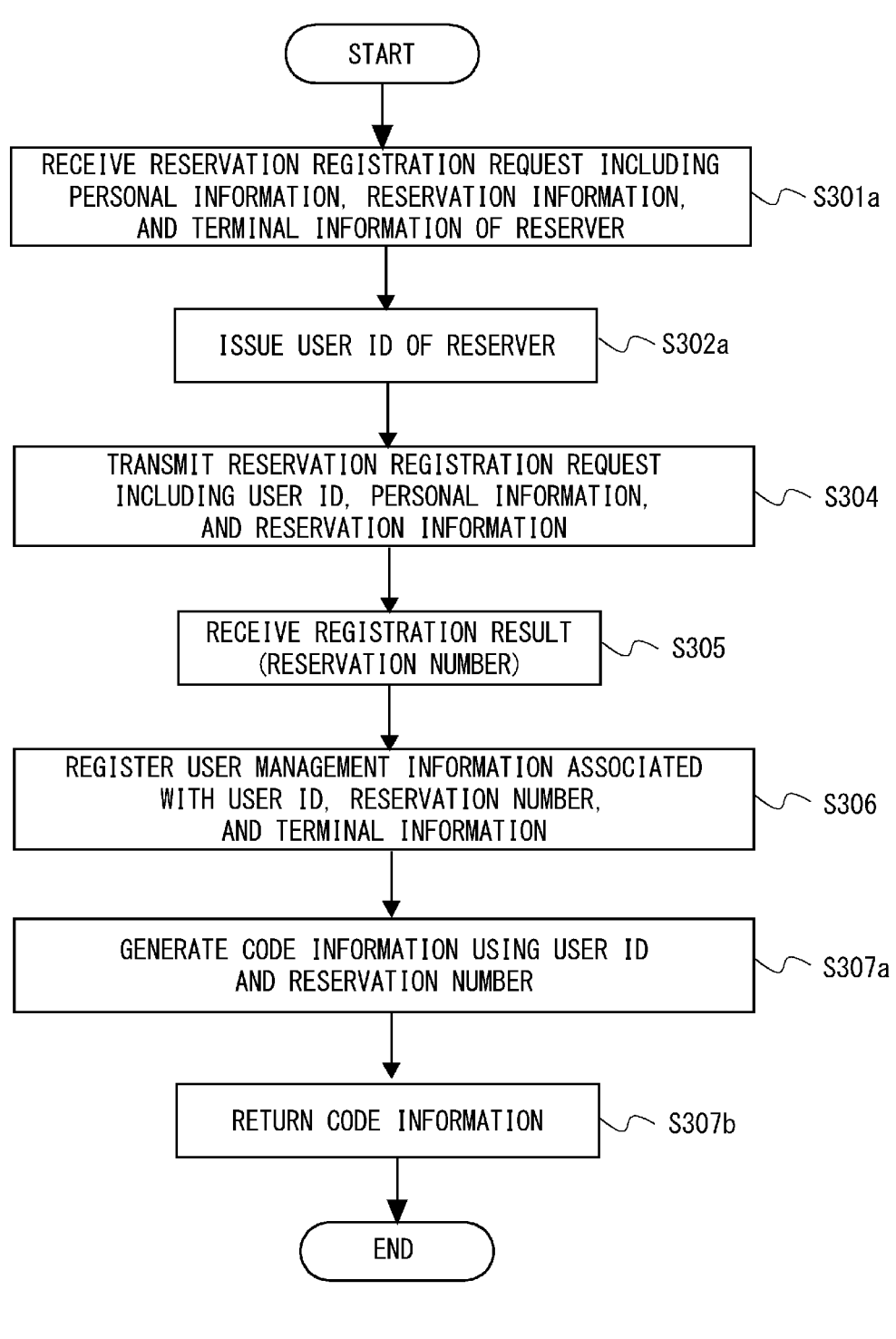
FIG. 20 is a flowchart showing a flow of facility usage reservation processing according to the third example embodiment.

FIG. 20 is a flowchart showing a flow of facility usage reservation processing according to the third example embodiment. First, the mobile terminal 100-1 transmits a reservation registration request including the personal information, the reservation information, and the terminal information about the reserver U1 to the facility usage control apparatus 300 via the network N. In response, the registration unit 341 of the facility usage control apparatus 300 receives the reservation registration request including the personal information, the reservation information, and the terminal information of the reserver U1 from the mobile terminal 100-1 via the network N (S301a).

The registration unit 341 confirms the personal information and reservation information included in the reservation registration request, and if there is no problem, issues the user ID of the reserver U1 (S302a). As described above, the facility usage control apparatus 300 may request the hotel staff U3 to confirm or approve the reservation. Next, the registration unit 341 executes Steps S304 to S306 as in FIG. 9. After that, the registration unit 341 generates the code information using the user ID issued in Step S302a and the reservation number received in Step S305 (S307a). The registration unit 341 then returns the generated code information to the mobile terminal 100-1 via the network N (S307b). In response, the mobile terminal 100-1 stores the received code information 122a in the storage unit 120.

Figure 21:
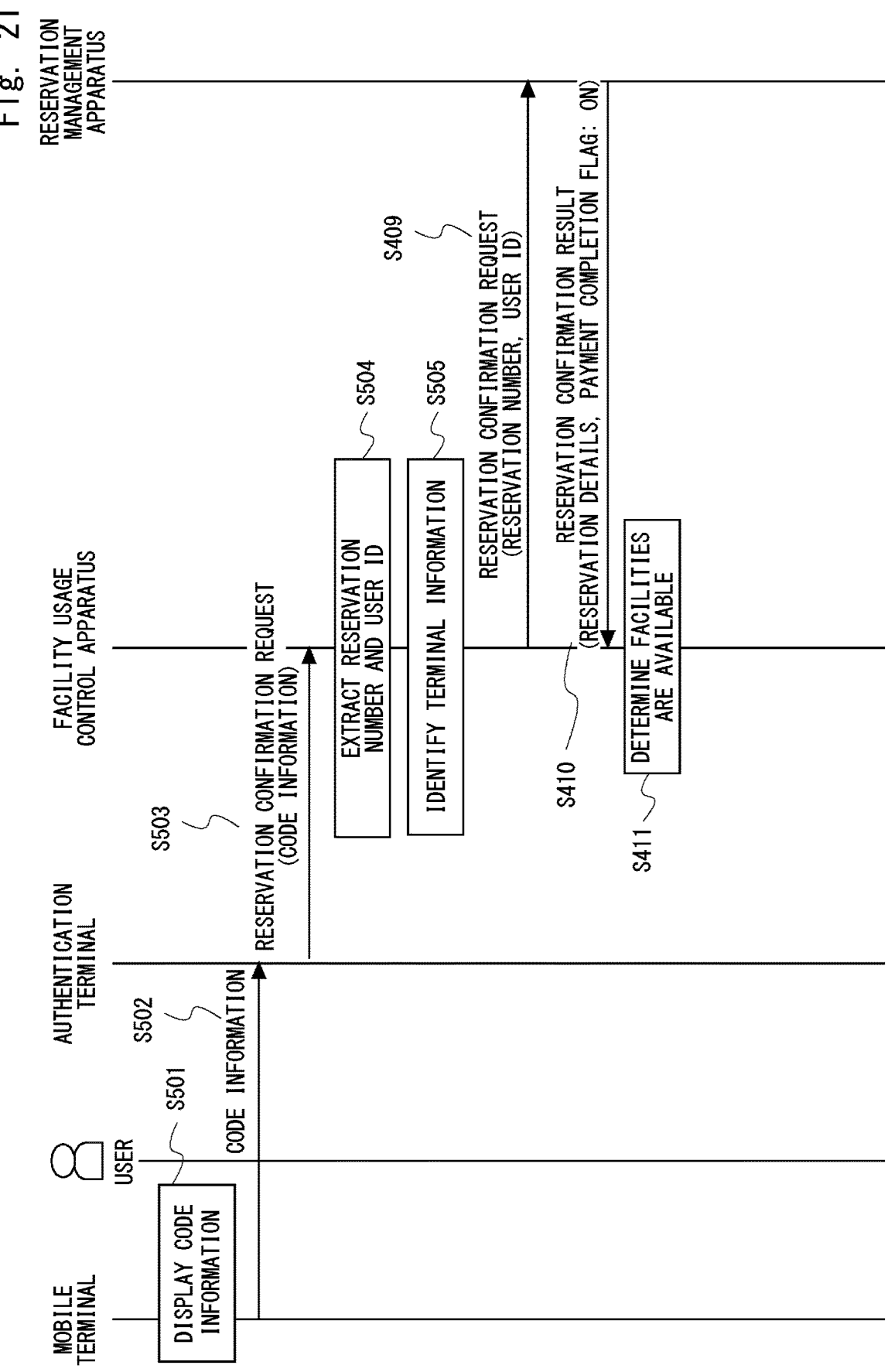
FIG. 21 is a flowchart showing a flow of check-in processing (first half) according to the third example embodiment.

FIG. 21 is a flowchart showing a flow of the check-in processing (first half) according to the third example embodiment. First, the mobile terminal 100-2 displays the code information 122a on the screen in response to the user U2's operation (S501). Next, the user U2 holds up the screen of the mobile terminal 100-2 on which the code information 122a is displayed toward the camera 510 of the authentication terminal 500-2. In response, the authentication terminal 500-2 uses the camera 510 to capture the code information 122a displayed on the mobile terminal 100-2 (S502). Next, the authentication terminal 500-2 transmits the reservation confirmation request including the captured code information (and the room number) to the facility usage control apparatus 300 via the network N (S503). The authentication terminal 500-2 may analyze the captured code information, extract the reservation number and the user ID, and include the extracted reservation number and the user ID in the reservation confirmation request.

The authentication control unit 342 of the facility usage control apparatus 300 receives the reservation confirmation request from the authentication terminal 500-2 via the network N, and acquires the code information included in the reservation confirmation request. Next, the identification unit 343 analyzes the code information and extracts the reservation number and the user ID (S504). Next, the identification unit 343 identifies the terminal information 3123 associated with the extracted user ID 3121 (S505). After that, the identification unit 343 transmits a reservation confirmation request (S409) and receives the reservation confirmation result (S410) as in FIG. 11. Based on the received reservation confirmation result, the determination unit 344 determines whether or not the user U2 can use the guest room and other facilities of the hotel 600. Here, the determination unit 344 determines that the user U2 can use the guest room and other facilities of the hotel 600 (S411). After that, the processing of FIG. 13 described above is performed.

In the pre-entry authentication processing according to the third example embodiment, the code information is used instead of a face image, and the user ID is identified by analyzing the code information instead of face authentication. Therefore, in Step S435, the determination unit 344 determines whether or not the received room number matches the room number associated with the user ID identified from the code information. When the room numbers match, the unlock unit 348 transmits an unlock instruction of the gate apparatus 641 to the authentication terminal 500-4. This allows the user U4 to enter the guest room 640.

Thus, in third example embodiment, biometric information such as a face image is not used and instead the code information issued at the time of reservation is used identify the person and confirm the reservation information. Therefore, in the third example embodiment, check-in processing and access to assigned rooms can also be conducted in a contactless manner. Therefore, the third example embodiment can produce the same effects as those of the second example embodiment described above. In addition, according to the third example embodiment, since there is no need to provide biometric information, the provision of personal information can be minimized.

Fourth Example Embodiment

A fourth example embodiment is a modified example of the second example embodiment as described above. In this fourth example embodiment, the authentication terminal 500 is a walk-through type terminal. Therefore, for example, the gate apparatus 621 installed at the boundary between the entrance 610 and the EV hole 620 in FIG. 3 may be opened in principle. The authentication terminal 500-2, which is a walk-through type terminal, detects the user U2 and transmits the face image to the facility usage control apparatus 300 when the face image is captured. The facility usage control apparatus 300 confirms the reservation of the user U2 as described above in Steps S405 to S410 of FIG. 11, and determines that the user U2 cannot use the guest room and other facilities of the hotel when the reservation confirmation is not made. In this case, the facility usage control apparatus 300 transmits the lock instruction of the gate apparatus to the authentication terminal 500-2. Next, the authentication terminal 500-2 outputs the lock instruction to the gate apparatus 621 in response to the received lock instruction. Thus, the gate apparatus 621 closes the gate in response to the lock instruction. This prevents the user U2 from entering the area beyond the EV hall 620.

Thus, the fourth example embodiment can also produce the same effects as those of the second example embodiment described above.

Other Example Embodiment

Although the facility usage control apparatus 300 and the authentication apparatus 200 have been described as separate information processing apparatuses in the above-mentioned second to fourth example embodiments, they may be the same. For example, the facility usage control apparatus 300 may further associate the face feature information with the user ID 3121 of the user management information 312 and register it. In this case, the control unit 340 may include the face detection unit 220, the feature point extraction unit 230, the registration unit 240, and the authentication unit 250 shown in FIG. 6.

In the above example, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Furthermore, the present disclosure is not limited to the example embodiments mentioned above and can be modified as needed within the scope of the intended purpose. Additionally, the present disclosure may be implemented by appropriately combining different example embodiments.

The whole or part of the example embodiments disclosed above can be described as, but not limited to, the following supplementary notes.

(Supplementary Note A1)

A facility usage control apparatus comprising:

registration means for registering identity identification information for registration of a user who makes a reservation to use a predetermined facility, a mobile terminal of the user, and reservation information of the facility in association with each other;

authentication control means for controlling authentication using the identity identification information for registration based on identity identification information for authentication acquired from the user through a first authentication terminal installed at the facility;

identification means for identifying the reservation information associated with the identity identification information for registration of the user who has been successfully authenticated;

determination means for determining availability of the facility based on the identified reservation information;

signature request means for making a signature request to the mobile terminal associated with the identity identification information for registration when the user is determined that he/she can use the facility; and signature acquisition means for acquiring signature data input by the user to the mobile terminal.

(Supplementary Note A2)

The facility usage control apparatus according to supplementary note A1, wherein the registration means registers the acquired signature data in association with the identified reservation information.

(Supplementary Note A3)

The facility usage control apparatus according to supplementary note A1 or A2, wherein the determination means takes into account physical condition information acquired from the user through the first authentication terminal to determine the availability of the facility.

(Supplementary Note A4)

The facility usage control apparatus according to any one of supplementary notes A1 to A3, wherein the identity identification information for registration and the identity identification information for authentication are biometric information, and the authentication control means controls biometric authentication as the authentication.

(Supplementary Note A5)

The facility usage control apparatus according to any one of supplementary notes A1 to A4, wherein the determination means requests, when it is determined that a usage fee of the facility is unpaid based on the identified reservation information, the mobile terminal associated with the identification information for registration to pay the usage fee, and when the usage fee is paid through the mobile terminal, the determination means determines that the user can use the facility.

(Supplementary Note A6)

The facility usage control apparatus according to any one of supplementary notes A1 to A5, further comprising notification means for notifying the mobile terminal of area information available to the user within the facility after the signature data is acquired.

(Supplementary Note A7)

The facility usage control apparatus according to any one of supplementary notes A1 to A6, wherein the authentication control means controls the authentication based on the identity identification information for authentication acquired from the user through a second authentication terminal installed at an entrance of an area within the facility available to the user after the signature data is acquired, and the facility usage control apparatus further comprises unlock means for unlocking the entrance when the authentication is successful.

(Supplementary Note B1)

A facility usage control system comprising:

a mobile terminal of a user who makes a reservation to use a predetermined facility;

a first authentication terminal installed at the facility; and a facility usage control apparatus configured to control the use of the facility, wherein the facility usage control apparatus comprises:

registration means for registering identity identification information for registration of the user, the mobile terminal of the user, and reservation information of the facility in association with each other;

authentication control means for controlling authentication using the identity identification information for registration based on identity identification information for authentication acquired from the user through the first authentication terminal;

identification means for identifying the reservation information associated with the identity identification information for registration of the user who has been successfully authenticated;

determination means for determining availability of the facility based on the identified reservation information;

signature request means for making a signature request to the mobile terminal associated with the identity identification information for registration when the user is determined that he/she can use the facility; and signature acquisition means for acquiring signature data input by the user to the mobile terminal.

(Supplementary Note B2)

The facility usage control system according to supplementary note B1, wherein the registration means registers the acquired signature data in association with the identified reservation information.

(Supplementary Note C1)

A facility usage control method performed by a computer comprising:

registering identity identification information for registration of a user who makes a reservation to use a predetermined facility, a mobile terminal of the user, and reservation information of the facility in association with each other;

controlling authentication using the identity identification information for registration based on identity identification information for authentication acquired from the user through a first authentication terminal installed at the facility;

identifying the reservation information associated with the identity identification information for registration of the user who has been successfully authenticated;

determining availability of the facility based on the identified reservation information;

making a signature request to the mobile terminal associated with the identity identification information for registration when the user is determined that he/she can use the facility; and acquiring signature data input by the user to the mobile terminal.

(Supplementary Note D1)

A non-transitory computer readable medium storing a facility usage control program for causing a computer to execute:

registration processing for registering identity identification information for registration of a user who makes a reservation to use a predetermined facility, a mobile terminal of the user, and reservation information of the facility in association with each other;

authentication control processing for controlling authentication using the identity identification information for registration based on identity identification information for authentication acquired from the user through a first authentication terminal installed at the facility;

identification processing for identifying the reservation information associated with the identity identification information for registration of the user who has been successfully authenticated;

determination processing for determining availability of the facility based on the identified reservation information;

signature request processing for making a signature request to the mobile terminal associated with the identity identification information for registration when the user is determined that he/she can use the facility; and signature acquisition processing for acquiring signature data input by the user to the mobile terminal.

Although the present disclosure has been described above with reference to example embodiments (and examples), the present disclosure is not limited to the above example embodiments (and examples). Various changes can be made in the configurations and details of the present disclosure that can be understood by a person skilled in the art within the scope of the present disclosure.

REFERENCE SIGNS LIST

1 FACILITY USAGE CONTROL APPARATUS
11 REGISTRATION UNIT
12 AUTHENTICATION CONTROL UNIT
13 IDENTIFICATION UNIT
14 DETERMINATION UNIT
15 SIGNATURE REQUEST UNIT
16 SIGNATURE ACQUISITION UNIT
1000 FACILITY USAGE CONTROL SYSTEM
U1 RESERVER
U2 USER
U3 HOTEL STAFF
U4 USER
N NETWORK
100 MOBILE TERMINAL
100-1 MOBILE TERMINAL
100-2 MOBILE TERMINAL
100-3 MOBILE TERMINAL
100-4 MOBILE TERMINAL
110 CAMERA
120 STORAGE UNIT
121 PROGRAM
122 RESERVATION NUMBER
130 MEMORY
140 COMMUNICATION UNIT
150 INPUT/OUTPUT UNIT
160 CONTROL UNIT
161 DISPLAY CONTROL UNIT
162 REGISTRATION UNIT
163 SIGNATURE PROCESSING UNIT
200 AUTHENTICATION APPARATUS
210 FACE INFORMATION DB
211 USER ID
212 FACE FEATURE INFORMATION
220 FACE DETECTION UNIT
230 FEATURE POINT EXTRACTION UNIT
240 REGISTRATION UNIT
250 AUTHENTICATION UNIT
300 FACILITY USAGE CONTROL APPARATUS
310 STORAGE UNIT
311 PROGRAM
312 USER MANAGEMENT INFORMATION
3121 USER ID
3122 RESERVATION NUMBER
3123 TERMINAL INFORMATION
3124 ROOM NUMBER
3125 AUTHENTICATION HISTORY
320 MEMORY

330 COMMUNICATION UNIT
340 CONTROL UNIT
341 REGISTRATION UNIT
342 AUTHENTICATION CONTROL UNIT
343 IDENTIFICATION UNIT
344 DETERMINATION UNIT
345 SIGNATURE REQUEST UNIT
346 SIGNATURE ACQUISITION UNIT
347 NOTIFICATION UNIT
348 UNLOCK UNIT
400 RESERVATION MANAGEMENT APPARATUS
410 STORAGE UNIT
411 PROGRAM
412 RESERVATION INFORMATION DB
4121 RESERVATION NUMBER
4122 RESERVATION DETAILS
4123 PAYMENT COMPLETION FLAG
4124 RESERVER INFORMATION
41241 USER ID
41242 PERSONAL INFORMATION
41243 SIGNATURE DATA
420 MEMORY
430 COMMUNICATION UNIT
440 CONTROL UNIT
441 REGISTRATION UNIT
442 SEARCH UNIT
500 AUTHENTICATION TERMINAL
500-2 AUTHENTICATION TERMINAL
500-3 AUTHENTICATION TERMINAL
500-4 AUTHENTICATION TERMINAL
510 CAMERA
520 STORAGE UNIT
521 PROGRAM
530 MEMORY
540 COMMUNICATION UNIT
550 INPUT/OUTPUT UNIT
560 CONTROL UNIT
561 DISPLAY CONTROL UNIT
562 AUTHENTICATION REQUEST UNIT
563 LOCK CONTROL UNIT
101 SIGNATURE INPUT SCREEN
102 SIGNATURE INPUT FIELD
103 SIGNATURE REGISTRATION BUTTON
101a CHECK-IN COMPLETION NOTIFICATION SCREEN
104 ROOM NUMBER
105 AVAILABLE ENTRY TIME PERIOD
106 CHECK-OUT TIME
107 GUIDANCE INFORMATION
600 HOTEL
610 ENTRANCE
611 STAFF ROOM
620 EV HALL
621 GATE APPARATUS
630 GUEST ROOM
631 GATE APPARATUS
640 GUEST ROOM
641 GATE APPARATUS
700 USAGE APPROVAL SCREEN
701 RESERVATION DETAILS
702 PAYMENT STATUS
703 FACE IMAGE OF RESERVER
704 APPROVE BUTTON
705 DECLINE BUTTON
700a ROOM NUMBER ASSIGNMENT SCREEN
706 SIGNATURE DATA
707 ROOM NUMBER SELECTION FIELD

708 ASSIGNMENT BUTTON
100*a* MOBILE TERMINAL
122*a* CODE INFORMATION

What is claimed is:

1. A facility usage control apparatus comprising:
at least one memory storing instructions; and
at least one processor configured to execute, according to the instructions, a process comprising:
registering identity identification information for registration of a user who makes a reservation to use a predetermined facility, a mobile terminal of the user, and reservation information of the facility in association with each other;
controlling authentication using the identity identification information for registration based on identity identification information for authentication acquired from the user through a first authentication terminal installed at the facility;
identifying the reservation information associated with the identity identification information for registration of the user who has been successfully authenticated;
determining availability of the facility based on the identified reservation information;
making a signature request to the mobile terminal associated with the identity identification information for registration when the user is determined that he/she can use the facility and outputting a message indicating that the signature request has been transmitted to the mobile terminal of the user to the first authentication terminal; and
acquiring signature data input by the user to the mobile terminal.

2. The facility usage control apparatus according to claim 1, wherein the registering includes registering the acquired signature data in association with the identified reservation information.

3. The facility usage control apparatus according to claim 1, wherein the determining includes taking into account physical condition information acquired from the user through the first authentication terminal to determine the availability of the facility.

4. The facility usage control apparatus according to claim 1, wherein:
the identity identification information for registration and the identity identification information for authentication are biometric information, and
the controlling authentication includes controlling biometric authentication as the authentication.

5. The facility usage control apparatus according to claim 1, wherein the determining includes:
requesting, when it is determined that a usage fee of the facility is unpaid based on the identified reservation information, the mobile terminal associated with the identification information for registration to pay the usage fee; and
determining that the user can use the facility when the usage fee is paid through the mobile terminal.

6. The facility usage control apparatus according to claim 1, wherein the process further comprises notifying the mobile terminal of area information available to the user within the facility after the signature data is acquired.

7. The facility usage control apparatus according to claim 1, wherein:
the controlling authentication includes controlling the authentication based on the identity identification information for authentication acquired from the user through a second authentication terminal installed at an entrance of an area within the facility available to the user after the signature data is acquired, and
the process further comprises unlocking the entrance when the authentication is successful.

8. A facility usage control system comprising:
a mobile terminal of a user who makes a reservation to use a predetermined facility;
a first authentication terminal installed at the facility; and
a facility usage control apparatus configured to control the use of the facility, wherein the facility usage control apparatus comprises:
at least one memory storing instructions; and
at least one processor configured to execute, according to the instructions, a process comprising:
registering identity identification information for registration of the user, the mobile terminal of the user, and reservation information of the facility in association with each other;
controlling authentication using the identity identification information for registration based on identity identification information for authentication acquired from the user through the first authentication terminal;
identifying the reservation information associated with the identity identification information for registration of the user who has been successfully authenticated;
determining availability of the facility based on the identified reservation information;
making a signature request to the mobile terminal associated with the identity identification information for registration when the user is determined that he/she can use the facility and outputting a message indicating that the signature request has been transmitted to the mobile terminal of the user to the first authentication terminal; and
acquiring signature data input by the user to the mobile terminal.

9. The facility usage control system according to claim 8, wherein the registering includes registering the acquired signature data in association with the identified reservation information.

10. A facility usage control method performed by a computer, the facility usage control method comprising:
registering identity identification information for registration of a user who makes a reservation to use a predetermined facility, a mobile terminal of the user, and reservation information of the facility in association with each other;
controlling authentication using the identity identification information for registration based on identity identification information for authentication acquired from the user through a first authentication terminal installed at the facility;
identifying the reservation information associated with the identity identification information for registration of the user who has been successfully authenticated;
determining availability of the facility based on the identified reservation information;
making a signature request to the mobile terminal associated with the identity identification information for registration when the user is determined that he/she can use the facility and outputting a message indicating that the signature request has been transmitted to the mobile terminal of the user to the first authentication terminal; and acquiring signature data input by the user to the mobile terminal.

11. A non-transitory computer readable medium storing a facility usage control program for causing a computer to execute:

registration processing for registering identity identification information for registration of a user who makes a reservation to use a predetermined facility, a mobile terminal of the user, and reservation information of the facility in association with each other;

authentication control processing for controlling authentication using the identity identification information for registration based on identity identification information for authentication acquired from the user through a first authentication terminal installed at the facility;

identification processing for identifying the reservation information associated with the identity identification information for registration of the user who has been successfully authenticated;

determination processing for determining availability of the facility based on the identified reservation information;

signature request processing for making a signature request to the mobile terminal associated with the identity identification information for registration when the user is determined that he/she can use the facility and outputting a message indicating that the signature request has been transmitted to the mobile terminal of the user to the first authentication terminal; and signature acquisition processing for acquiring signature data input by the user to the mobile terminal.

\*　\*　\*　\*　\*